United States Patent
Kakigi

[11] Patent Number: 6,122,464
[45] Date of Patent: Sep. 19, 2000

[54] CONTROLLER FOR CONTROLLING IMAGE FORMATION APPARATUS

[75] Inventor: Nobuyoshi Kakigi, Sakura, Japan

[73] Assignee: Canon Kabushiki Kaisha, Tokyo, Japan

[21] Appl. No.: 09/105,259

[22] Filed: Jun. 26, 1998

[30] Foreign Application Priority Data

Jun. 30, 1997 [JP] Japan .................................. 9-174283

[51] Int. Cl.[7] .................................................. G03G 21/00
[52] U.S. Cl. .............................. 399/82; 399/21; 399/71; 399/410
[58] Field of Search .................................. 399/9, 24, 38, 399/18, 21, 16, 75, 82, 83, 410, 71, 361

[56] References Cited

U.S. PATENT DOCUMENTS

| | | | |
|---|---|---|---|
| 4,922,294 | 5/1990 | Nakagami et al. | 355/209 |
| 4,930,087 | 5/1990 | Egawa et al. | 364/518 |
| 4,999,654 | 3/1991 | Maruo et al. | 346/160 |
| 5,305,055 | 4/1994 | Ebner et al. . | |
| 5,383,012 | 1/1995 | Yamada . | |
| 5,414,494 | 5/1995 | Aikens et al. . | |
| 5,420,667 | 5/1995 | Kaneko et al. . | |
| 5,548,728 | 8/1996 | Danknick | 395/200.14 |
| 5,568,618 | 10/1996 | Motoyama | 395/280 |
| 5,600,403 | 2/1997 | Inoo | 399/8 |
| 5,696,853 | 12/1997 | Kawana et al. | 382/299 |
| 5,760,811 | 6/1998 | Seto et al. | 347/131 |

FOREIGN PATENT DOCUMENTS

| | | |
|---|---|---|
| 0 654 757 | 5/1995 | European Pat. Off. . |
| 0 661 600 | 7/1995 | European Pat. Off. . |

Primary Examiner—Richard Moses
Attorney, Agent, or Firm—Fitzpatrick, Cella, Harper & Scinto

[57] ABSTRACT

A video controller which manages an optional controller for controlling a sheet stapling device inputs a job from a computer, reserves an instruction of a sheet process in unit of sheet for plural sheets to the optional controller according to the input job, and outputs to the optional controller an instruction to execute a pull-up process of a stapling member in preference to execution of the already-reserved instruction according as the stapling member was supplemented in the sheet stapling device.

22 Claims, 13 Drawing Sheets

A : STAPLING JOB INHIBITION BIT

B : TEST STAPLING DEMAND BIT

C : NO NEEDLE SENSOR BIT

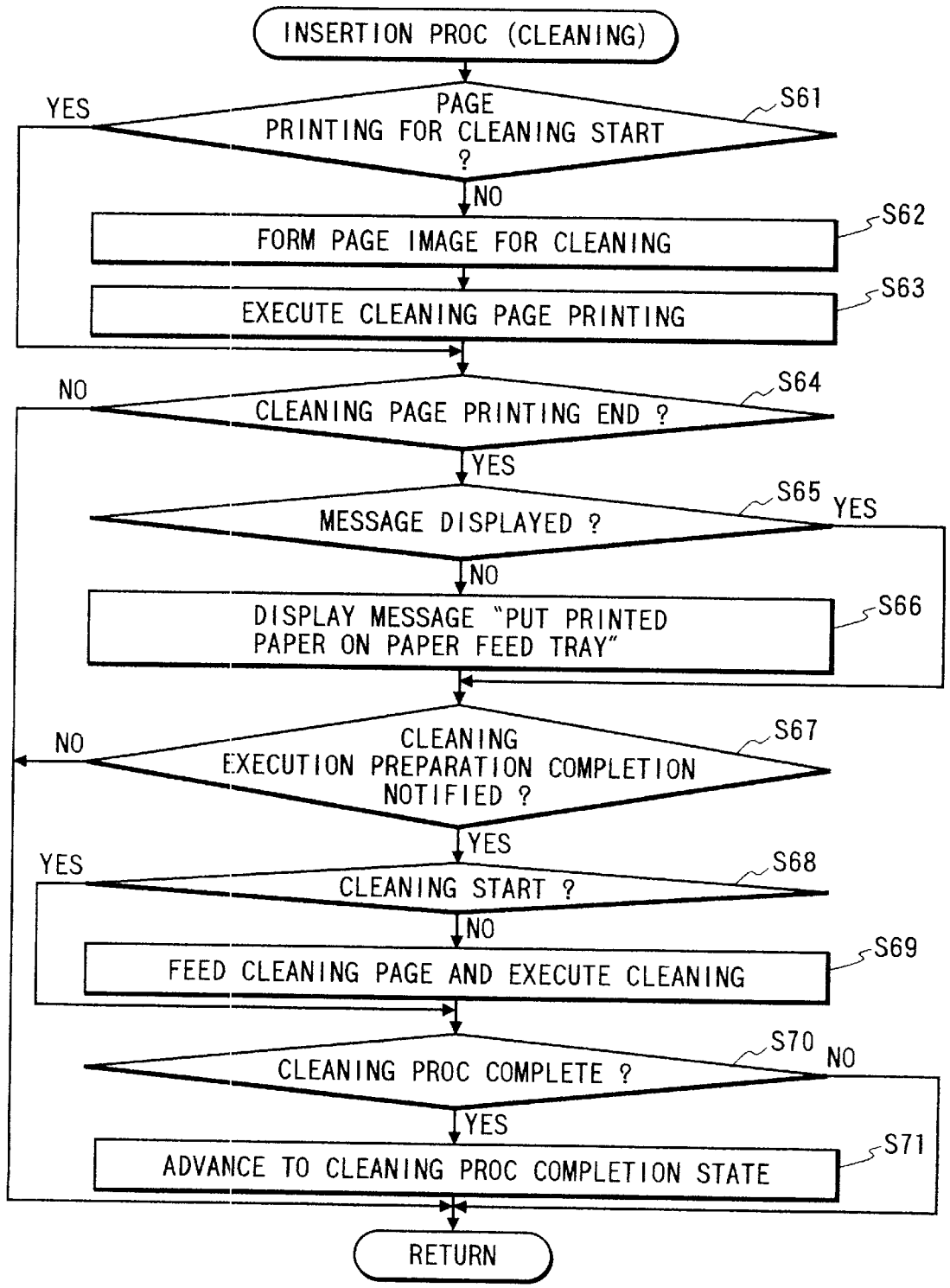

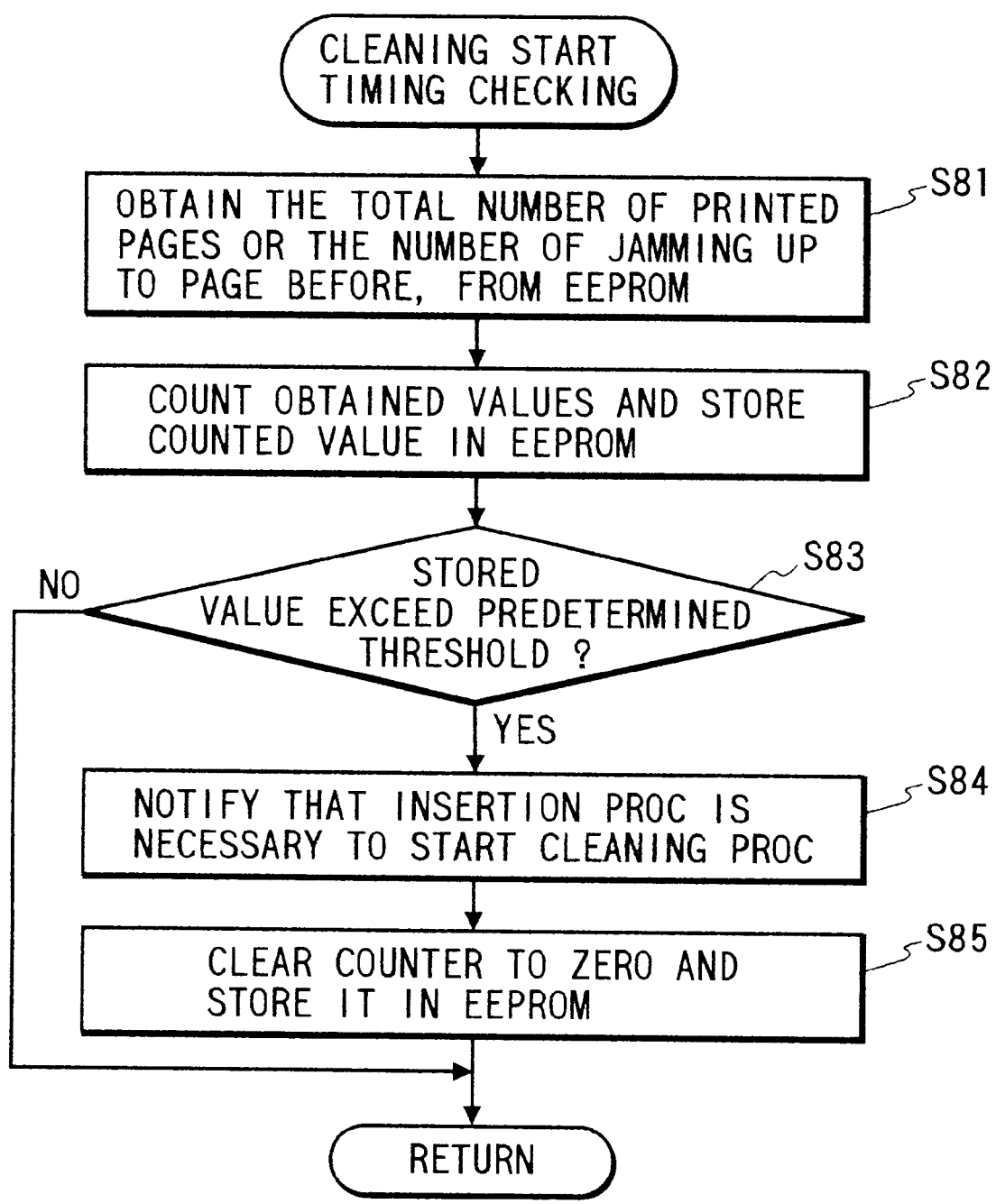

CONTROLLER FOR CONTROLLING IMAGE FORMATION APPARATUS

BACKGROUND OF THE INVENTION

1. Field of the Invention

The present invention relates to a controller which manages a secondary controller for controlling sheet (or paper) carrying in an image formation apparatus or the like.

2. Related Background Art

In an image formation apparatus such as a laser beam printer or the like, page control information and printing information are formed in page units upon analyzing page description language (PDL) inputted from a host computer. Then, a selective control of a recording sheet feed unit and a recording sheet discharge unit is performed based on the page control information, and an image corresponding to the printing information is formed on a sheet.

More particularly, in the laser beam printer recently proposed, there are provided a video controller for forming the page control information and the printing information upon analyzing the page description language from the host computer, an engine controller for controlling an image formation unit in accordance with the page control information and the printing information from the video controller, and an optional controller for controlling optional units which perform a sheet feeding process, a sheet discharging process and a sheet stapling process in accordance with the page control information from the video controller. In order to cope with a case where a sheet carrying distance from the optional unit for feeding a sheet to a printer is long, it has been proposed that the page control information be used for a page on which an image is formed after several pages or several tens of pages are previously transferred to the optional controller from the video controller.

In such a laser beam printer as proposed above, the video controller previously transfers the page control information that is later managed to the optional controller and the engine controller. Then, the video controller manages a timing of the control performed in the optional controller and the engine controller, whereby a maximum throughput can be obtained.

However, in this structure, if it is considered that there is no stapling member (i.e., stapling needle) in the optional unit which performs the sheet stapling process after the video controller transfers the page control information including the stapling process to the optional controller, the optional controller is going to execute the page control information already transferred from the video controller, as it is. Therefore, there occurs such a problem as the process is advanced without being supplied with the stapling member.

Although it is required to perform a cleaning operation on a photosensitive drum after executing a jamming process of recording sheets, like the above problem, since the optional controller is going to execute the page control information already transferred as it is after the sheet jamming process, there occurs such a problem as the process is advanced without performing the cleaning operation.

SUMMARY OF THE INVENTION

An object of the present invention is to provide a controller for solving the above-described problems.

An another object of the present invention is to improve a controller which manages a secondary controller.

Yet another object of the present invention is to provide a controller to improve a throughput of an image formation apparatus and realize a desired job.

The above and other objects and features of the present invention will become apparent from the following embodiments and the attached drawings.

BRIEF DESCRIPTION OF THE DRAWINGS

FIG. 12 is a flow chart for explaining a cleaning process in the insertion process shown in FIG. 9; and FIG. 13 is a flow chart for explaining a method for notifying a timing for executing the cleaning process to a sub-scheduling process unit.

DETAILED DESCRIPTION OF THE PREFERRED EMBODIMENTS

First Embodiment

Figure 1:
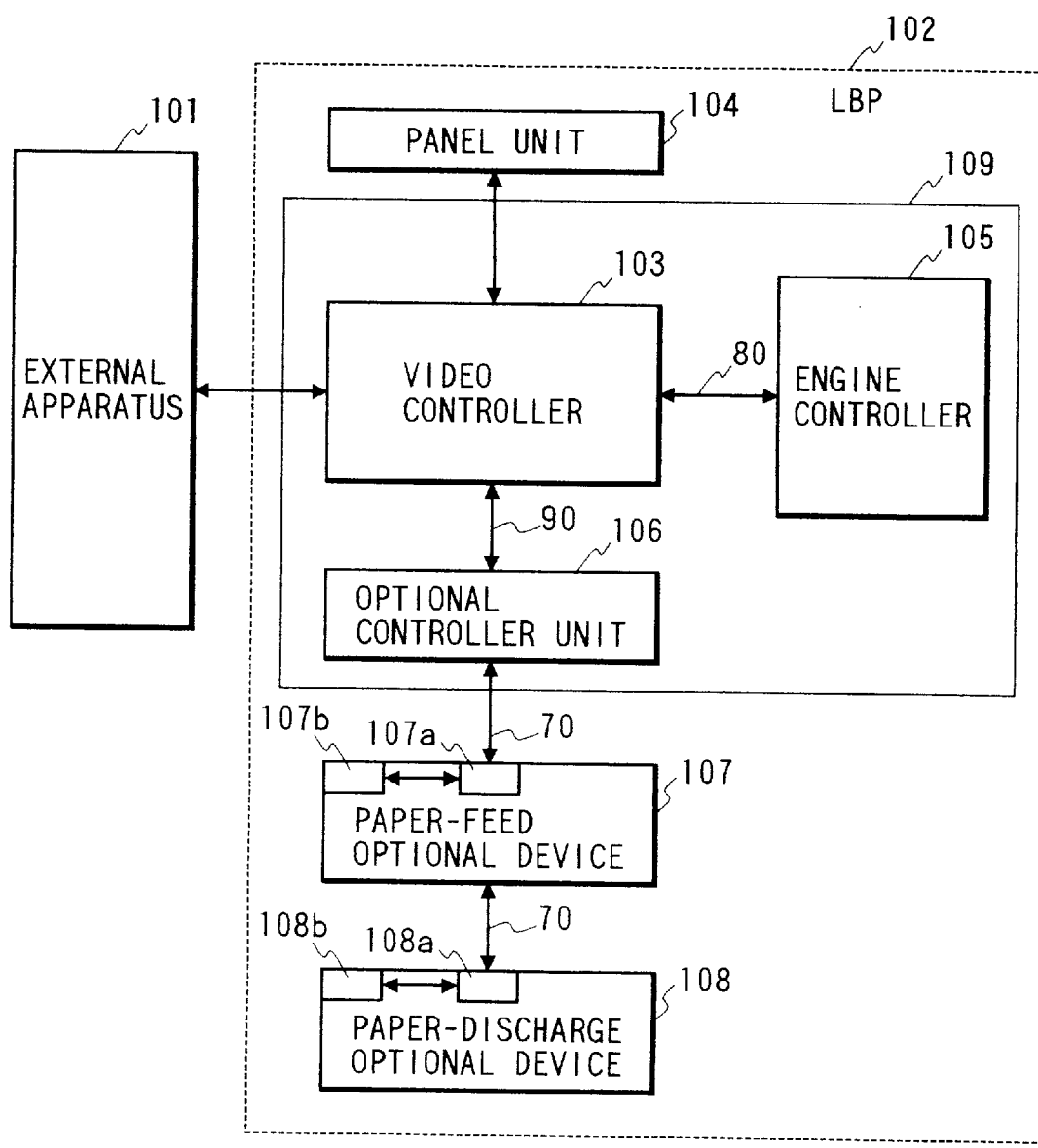
FIG. 1 is a block diagram for explaining the structure of an image recording apparatus indicated in a first embodiment of the present invention.

FIG. 1 is a block diagram for explaining the structure of an image recording apparatus according to the first embodiment of the present invention. For example, a case where a laser beam printer is used will be explained.

In FIG. 1, a laser beam printer 102 (to be simply referred as printer hereinafter), to which various optional devices can be connected, is connected to an external apparatus 101 such as a host computer or the like through a general-purpose interface (e.g., centronics interface, RS232C interface or the like). Thus, the printer 102 performs an image recording based on printing information (control information such as code data or the like based on a predetermined printer language (e.g., PostScript, LIPS III, LIPS IV (all trade names)) including image data or the like) transferred from the external apparatus 101 through the general-purpose interface. A video controller 103 is connected to the external apparatus 101 by the general-purpose interface and receives code data (ESC code, various PDL data or the like) transferred from the external apparatus 101 through the general-purpose interface to generate page information composed of dots data or the like based on the code data. The video controller 103 transmits image data (binary or multi-value) to an engine controller 105 described later through a video interface 80 and also transmits a command for designating a sheet feed unit, a command for designating a sheet discharge unit or the like to an optional controller unit 106 described later through a generalized interface 90. The engine controller 105 forms a latent image on a photosensitive drum by using a known electrophotographic process based on the image data transferred from the video controller 103 and performs printing by transferring the latent image on a fed sheet to fix it. At this time, the engine controller 105 performs an instruction of sheet-feeding/discharging timing or the like to the optional controller unit 106 through the video controller 103.

A panel unit 104, composed of various switches (buttons) for operation, LED display units, liquid crystal display (LCD) units or the like, acts as an interface for a user. The user can instruct a predetermined operation to the printer 102 by operating the panel unit 104. Various data and the like set by the user on the panel unit 104 are stored and managed in a not-shown non-volatile memory (e.g., NVRAM, EEPROM) installed in a control unit 109.

The optional controller unit 106 having a CPU, a ROM, a RAM (all not shown) or the like entirely controls more than one optional device (unit) as a generalized controller based on the designation of the sheet feed unit, the sheet discharge unit or the like transferred from the video controller 103 and the instruction of sheet-feeding/discharging timing or the like from the engine controller 105. The optional controller unit 106 entirely controls various optional devices by communicating with optional controller units provided in the various optional devices through an optional unit interface 70.

Figure 10:
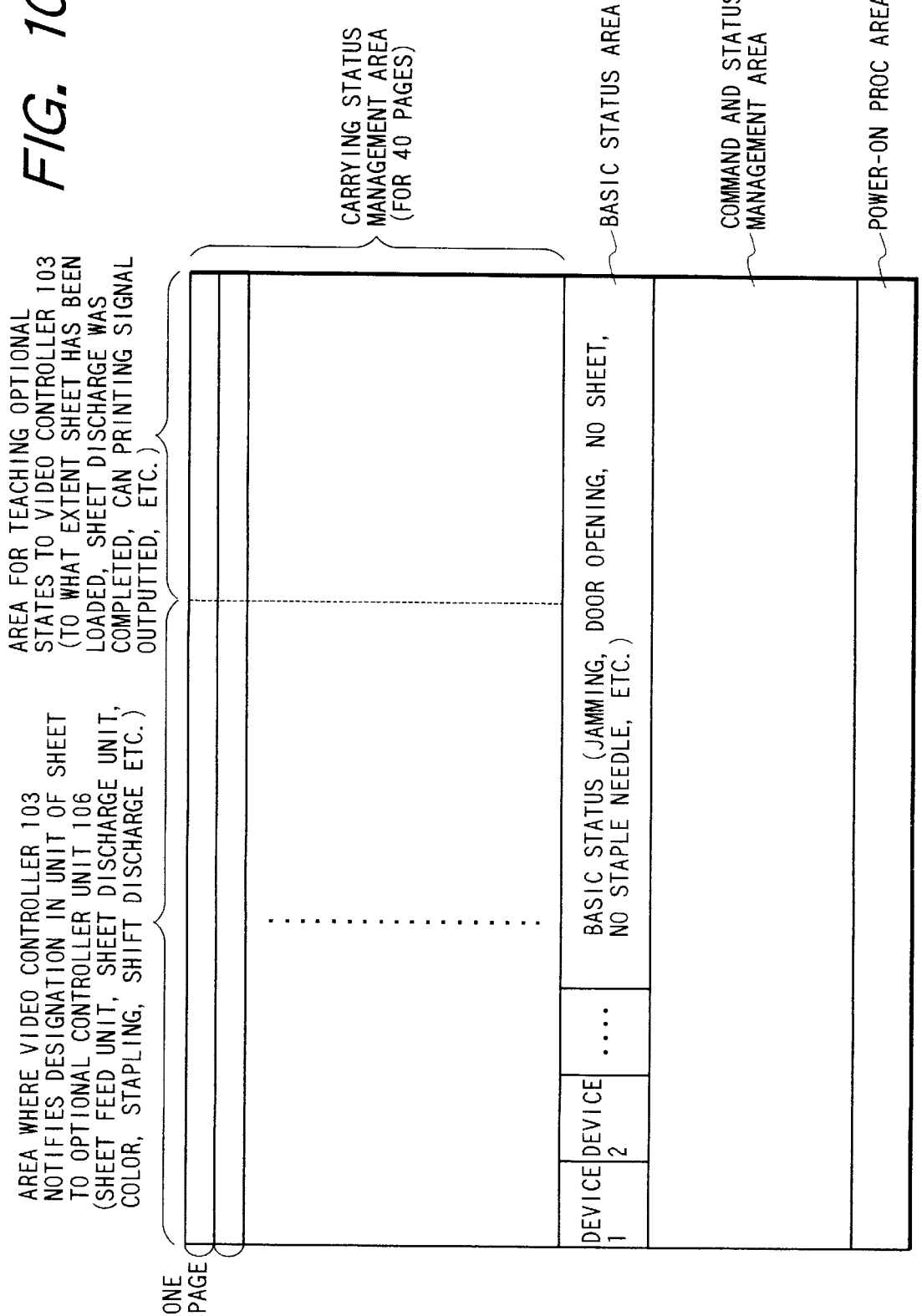
FIG. 10 is a schematic view of a memory, which is commonly held by the video controller, secured in a RAM provided in the optional controller unit shown in FIG. 1.

In the RAM of the optional controller unit 106, a common memory which the video controller 103 can access is provided. As shown in FIG. 10, the common memory is structured by a feeding status management area for 40 pages, a basic status area, a command and status management area, a power-on process area or the like. The video controller 103 performs the designation for each optional device through each area in the common memory.

The feeding status management area is structured by an area used by the video controller 103 to notify the designation with a sheet unit (e.g., sheet feed unit, sheet discharge unit, color, stapling, shift discharging or the like) to each optional device and an area used for notifying the state of each optional device (to what extent a printing has been completed, sheet discharge has been completed or the like) to the video controller 103. The feeding status management area for 40 pages is provided in order that the video controller 103 previously reserves the designation of each page for the optional controller unit 106. Consequently, even if any sheet feed unit or sheet discharge unit may be designated, it becomes possible to carry sheets and form images sequentially without delaying.

The basic status area acts as an area used for notifying an abnormality of each optional device (jamming, no sheet, no staple needle or the like) to the video controller 103. The command and status management area acts as an area used for performing communication of the command and the status with the video controller 103. The power-on process area acts as an area used by the video controller 103 to designate the power-on process of each optional device.

A sheet-feed optional device (unit) 107 is, e.g., a paper deck optional unit. The unit 107 contains a paper deck controller (large-capacity cassette controller) 107*a*, and performs a sheet feeding control based on control information transmitted from the optional controller unit 106. The paper deck controller 107*a* has a CPU, a ROM and a RAM (all not shown), and the CPU controls the sheet-feed optional device 107 based on a program stored in the ROM. Further, in the ROM, expansion information of the sheet-feed optional device 107, e.g., information of the sheet size capable of being held in a paper deck, and the like have been stored.

A sheet-discharge optional device (unit) 108 is, e.g., a finisher optional unit having a stapling function. The unit 108 contains a finisher controller (large-capacity sheet-discharge stacker controller) 108*a*, and performs a stapling operation and a sheet discharging operation based on the control information transmitted from the optional controller unit 106. The finisher controller 108*a* has a CPU, a ROM and a RAM (all not shown), and the CPU controls the sheet-discharge optional device 108 based on a program stored in the ROM. In the ROM, expansion information of the sheet-discharge optional device 108 has been stored. For example, the expansion information relates to the number of sheet discharge bins, presence/absence of the stapling function, presence/absence of a shifting function to shift a discharged sheet in a predetermined direction, an inverse rotation function to inversely rotate the face direction of the discharged sheet, and the like.

In the sheet-feed optional device 107 and the sheet-discharge optional device 108, a display unit and operation units 107*b* and 108*b* are provided respectively. Therefore, it becomes possible to display messages, an operating method and the like for a user in using of each optional device to be operated.

The control unit 109 is structured by the engine controller 105 for controlling a printing process of the printer 102, the video controller 103 for controlling the entire printer 102 and converting data into image data upon analyzing data transmitted from the external apparatus 101 such as the host computer or the like and the optional controller unit 106 for entirely controlling various optional units.

The optional controller unit 106 manages each optional unit by using the common optional unit interface 70 and communicates with the video controller 103 through the generalized interface 90. In the present embodiment, it is featured that the video controller 103 controls each of sheet-feed and discharge optional devices via the optional controller unit 106.

Figure 2:
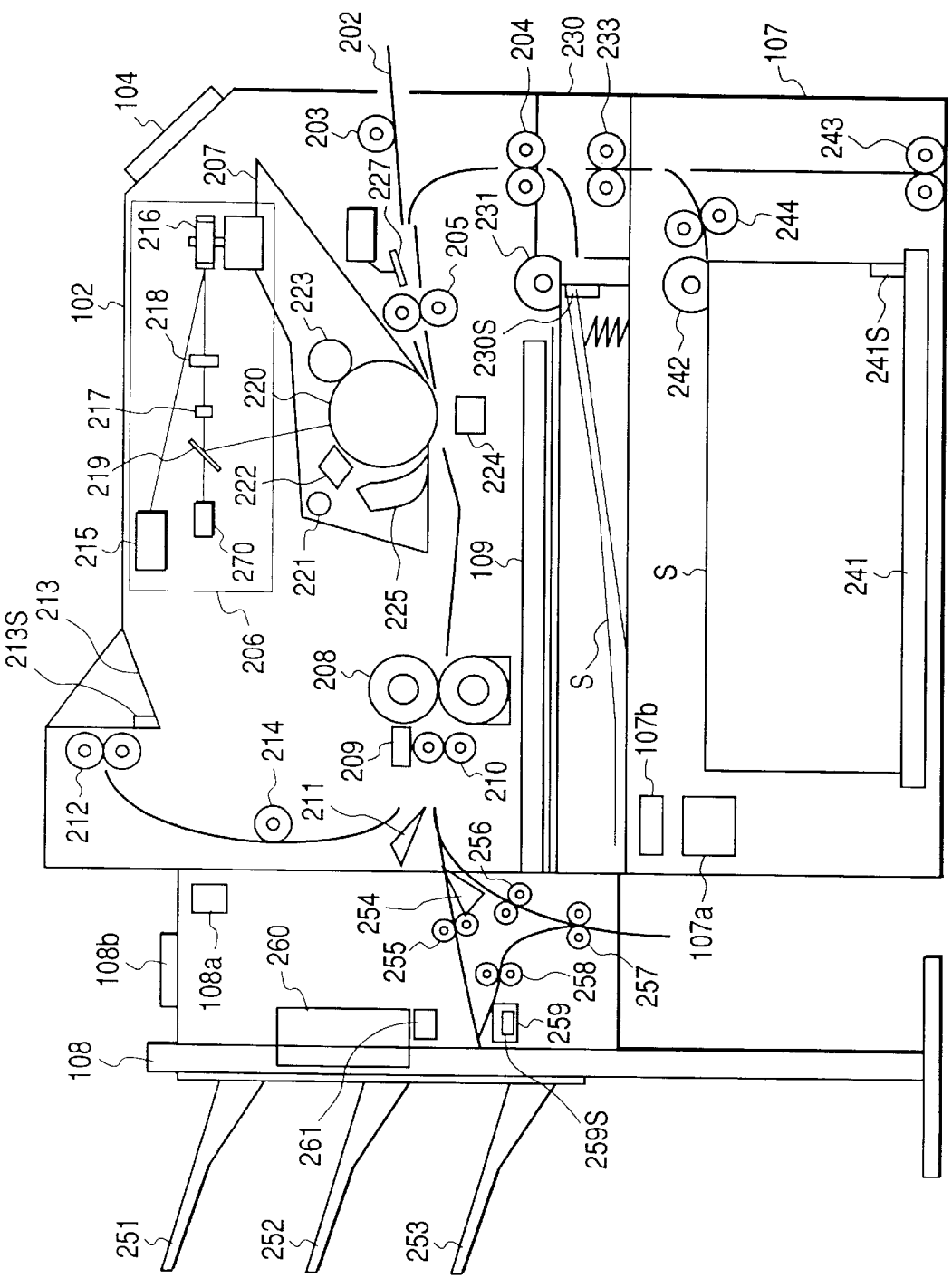
FIG. 2 is a cross-sectional view for explaining the structure of a printer shown in FIG. 1.

FIG. 2 is a cross-sectional view for explaining the structure of the printer 102 shown in FIG. 1. In FIG. 2, the elements same as those in FIG. 1 are added with the same reference numerals respectively.

In FIG. 2, a sheet cassette 230 holds recording sheets S and has a mechanism for detecting the size of recording sheets S based on position of a partition plate (not shown). A cassette sheet feed clutch 231 separates only one recording sheet of the most upper position from the recording sheets S mounted or stacked on the sheet cassette 230 and acts as a cam for carrying the separated recording sheet S to sheet feed rollers 204 by a driving means (not shown). The cam rotates intermittently every feeding and feeds one recording sheet in response to one rotation. A recording sheet detection sensor 230S detects the quantity of recording sheets S held in the sheet cassette 230.

A resist shutter 227 presses the sheets to stop the feeding. The sheet feed roller 204 carries the recording sheet S to such a position as a leading edge of the sheet reaches to the resist shutter 227. The recording sheets S are mounted on a manual feeding tray 202. A manual feeding sheet feed roller 203 carries the recording sheets S mounted on the manual feeding tray 202 to the resist shutter 227. Optional sheet feed rollers 233 (sheet feed relay carrying rollers) supply the recording sheets S fed from the sheet-feed optional device 107 to the inside of a main body of the printer 102.

A pair of resist rollers 205 for synchronously carrying the recording sheets S is provided in the downstream of the manual feeding sheet feed roller 203, the cassette sheet feed clutch 231 and the optional sheet feed rollers 233. An image recording unit 207 for forming a toner image on the recording sheet S by using the known electrophotographic process by a laser beam radiated from a laser scanner unit 206 is provided in the downstream of the resist rollers.

In the laser scanner unit 206, a laser unit 215 radiates the laser beam based on an image signal (VDO signal) transmitted from the video controller 103 shown in FIG. 1. The laser beam radiated from the laser unit 215 is scanned by a polygon mirror 216 for forming a latent image on a photosensitive drum 220 through an image formation lens group 218 and a reflection lens 219. A beam detector 217 detects the laser beam radiated from the laser unit 215 to output a main-scanning synchronization signal. A light quantity sensor 270 detects the light quantity of the laser beam radiated from the laser unit 215.

In the image recording unit 207, a primary charger 222 uniformly charges a surface of the photosensitive drum 220. A developing unit 223 toner develops the latent image formed on the photosensitive drum 220 charged by the primary charger 222 and is laser exposed by the laser scanner unit. A transfer charger 224 transfers a toner image on the photosensitive drum, which is developed by the developing unit 223, to the recording sheet S fed by the pair of resist rollers 205. A cleaner 225 eliminates the residual toner on the photosensitive drum 220. A pre-exposure lamp 221 discharges a surface of the photosensitive drum 220 by the light.

A fixing unit 208 thermal fixes the toner image, which is formed on the recording sheet S by the image recording unit 207, on the recording sheet S. Carrying rollers 210 carry the recording sheet S to discharge it. A sheet discharge sensor 209 detects the discharging state of the recording sheet S. A flapper 211 switches the carrying direction of the recorded recording sheet S to a side of a sheet discharge tray 213 or a side of the sheet-discharge optional device 108. A sheet discharge roller 214 and sheet discharge rollers 212 discharge the recording sheet S which is to be carried to the sheet discharge tray 213 depending on the switching of the flapper 211. A mounted quantity of discharged sheets detection sensor 213S detects the quantity of recording sheets mounted on the sheet discharge tray 213.

The engine controller 105 in the control unit 109 performs a control of the electrophotographic process which depends on the laser scanner unit 206, the image recording unit 207 and the fixing unit 208 and a carrying control of recording sheets held in the main body of the laser beam printer 102.

The video controller 103 connected to the external apparatus 101 such as a personal computer or the like by the general-purpose interface (e.g., centronics interface, RS232C interface or the like) develops image information transmitted through the general-purpose interface into bit data, which is transmitted to the engine controller 105 as a VDO signal through the video interface 80.

Subsequently, various optional units detachably connected to the main body of the printer 102 will be described.

The optional controller unit 106 shown in FIG. 1, which is provided in the main body of the printer shown in FIG. 2, is structured that various optional units can communicate by using the same protocol through the optional unit interface 70 acting as a common bus. The optional controller unit 106 is connected to the video controller 103 through the generalized interface 90.

In the sheet-feed optional device 107 such as the paper deck optional unit or the like, a paper deck 241 mounts a large capacity of the recording sheets S on a deck which moves up and down. A paper deck sheet feed roller 242 feeds the recording sheets S mounted on the paper deck 241. Carrying rollers 244 carry the recording sheets S fed from the paper deck sheet feed roller 242 in the direction of the optional sheet feed rollers 233. Sheet feed relay carrying rollers 243 relay carry recording sheets fed from plural other sheet-feed optional units (capable of feeding different-size or same-size recording sheets) which can be detachably connected to a lower portion of the paper deck optional unit. A quantity of held recording sheets detection sensor 241S detects the quantity of the recording sheets S mounted on the paper deck 241.

The paper deck optional unit 107 is controlled by the paper deck controller 107a.

In the sheet-discharge optional device 108 such as the finisher optional unit or the like, a primary sheet discharge bin 251, a secondary sheet discharge bin 252 and a third sheet discharge bin 253 are used for sorting and mounting the recorded recording sheets S. A bin elevating motor 260 sorts the recording sheets S to each bin by moving the sheet discharge bins 251 to 253 up and down. A flapper 254 performs a switching of carrying to switch faces of the recording sheets S, which are assigned by the flapper 211 in the main body of the printer 102 and are carried to the finisher optional unit 108, based on an instruction from the video controller 103. A discharged-sheet mounted-quantity detection sensor 261 detects the mounted quantity of recording sheets discharged to the primary sheet discharge bin 251 to the third sheet discharge bin 253 which are moved up and down by the bin elevating motor 260.

Further, the detection sensor 261 acts as a sensor for detecting a height of the sheets mounted or stacked on each of the primary sheet discharge bin 251 to the third sheet discharge bin 253. When the height of the mounted sheets reaches, e.g., 88 mm (corresponding to about 700 sheets), i.e., when the sensor 261 detects such the height, the finisher controller 108a notifies the video controller 103 of fullmounted mounting, through the optional controller unit 106.

About 700 sheets can be mounted on each of the bins 251 to 253, and thus about 2000 sheets can be mounted on the three bins as a whole. However, in a case where the stapling-processed sheets are mounted, since there is some fear that falling of the sheets occurs when the bin is moved by the motor 260, the detection level of the full-mounted sheet is set to be half the ordinary state (here 88 mm).

In a case where the video controller 103 designates face-up through the generalized interface 90, the recording sheet S assigned by the flapper 254 is fed to a sheet discharge exit by rollers 255. In a case where the video controller 103 designates face-down through the generalized interface 90, the recording sheet S assigned by the flapper 254 is once carried to such a position as a trailing edge of the recording sheet passes over rollers 256 by the rollers 256 and rollers 257. Thereafter, the rollers 257 inversely rotate to carry the recording sheet, from its trailing edge, to rollers 258 to feed it to the sheet discharge exit.

In a case where stapling is designated by the video controller 103 through the generalized interface 90, the recording sheets S are held in a stapling tray (not shown) and are aligned, then a stapler 259 performs the stapling to the sheets to discharge them to one of the primary sheet discharge bin 251 to the third sheet discharge bin 253. The stapler 259 can move in the vertical direction against the carrying direction.

In a case where a shifting is designated by the video controller 103 through the generalized interface 90, the recording sheets S are held in the stapling tray (not shown) and are arranged similar to the case of designating the stapling, then the recording sheets are discharged to one of the primary sheet discharge bin 251 to the third sheet discharge bin 253 after shifting the recording sheets S with the tray, that is, shifting a mounted area (tray) of the recording sheets S. A quantity of residual stapling needles detection sensor 259S detects the residual quantity of the stapling needles held in the stapler 259 and also can detect such a case as the stapling needles are supplied to the stapler 259.

The finisher optional unit 108 is controlled by the finisher controller 108a. A position of the stapler 259 is movably controlled by the finisher controller 108a.

The optional controller unit 106, the paper deck controller 107a and the finisher controller 108a are connected by the connector to perform a serial communication through the optional unit interface 70. These units are connected in series by using the same connector. Therefore, the connecting order of the paper deck optional unit 107 and the finisher optional unit 108 can be shifted.

The pair of resist rollers 205 for carrying the recording sheets S, the sheet feed rollers 204 and the carrying rollers 244 are provided in the downstream of the manual feeding sheet feed roller 203, the cassette sheet feed clutch 231 and the paper deck sheet feed roller 242 respectively. The image recording unit 207 for forming the toner image on the recording sheets S by the laser beam radiated from the laser scanner unit 206 is provided in the downstream of the pair of resist rollers 205. Further, the fixing unit 208 for thermal fixing the toner image formed on the recording sheet S is provided in the downstream of the image recording unit 207. The sheet discharge sensor 209 for detecting the carrying state of the sheet discharge unit, the carrying rollers 210 for carrying the recording sheets and the flapper 211 for switching the carrying direction of the recorded recording sheets and the like are provided in the downstream of the fixing unit 208.

Figure 3:
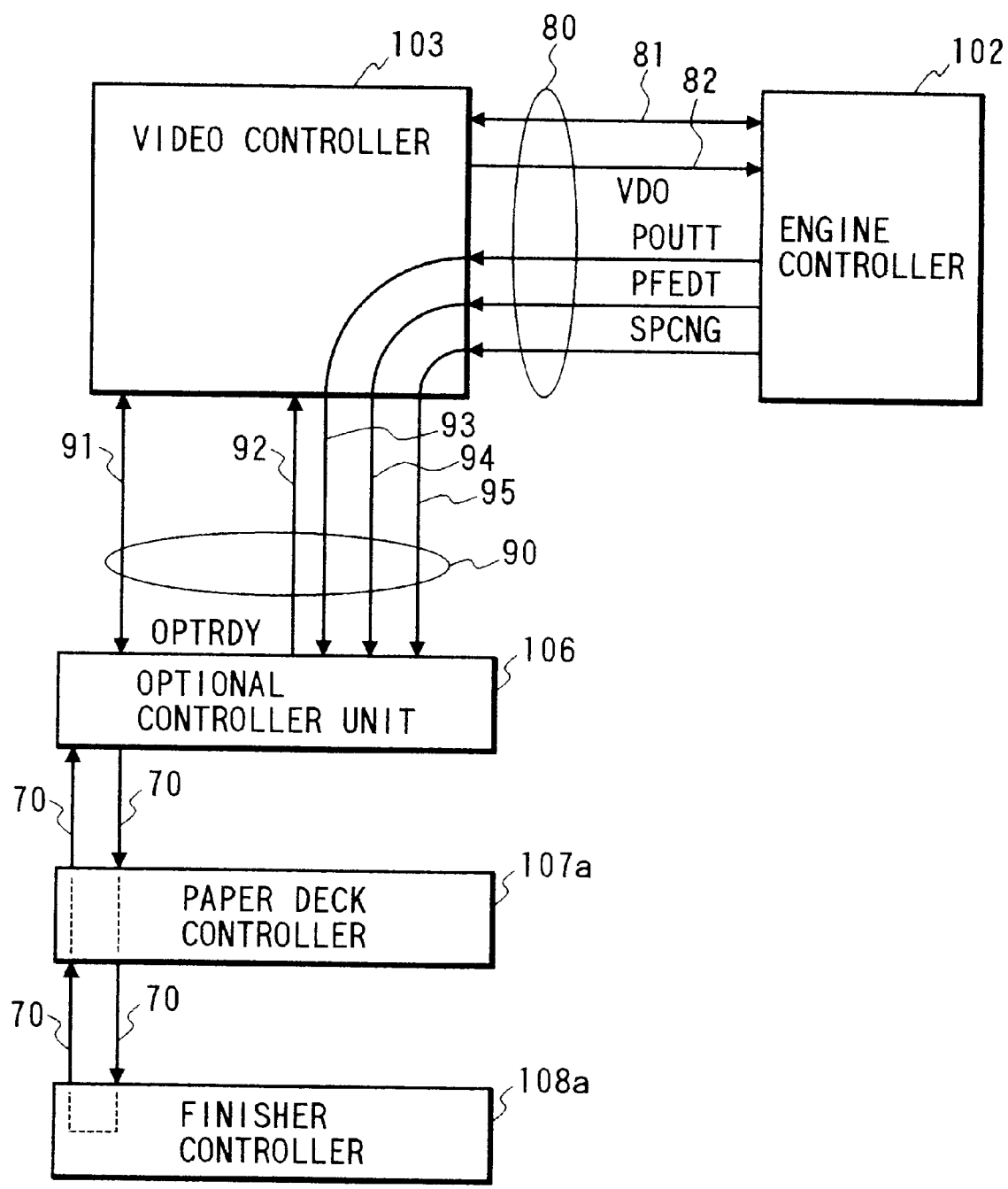
FIG. 3 is a block diagram for explaining the structure in a control of the printer shown in FIG. 1.

FIG. 3 is a block diagram for explaining a control performed by the printer 102 in FIG. 1. In FIG. 3, the elements same as those in FIG. 1 are added with the same reference numerals respectively.

In FIG. 3, a reference numeral 91 denotes a serial communication interface, wherein such a command as designating of the sheet feed for the paper deck optional unit 107, designating of the sheet discharge bin for the finisher optional unit 108 or the like is transmitted to the optional controller unit 106 from the video controller 103. Then, such a status as state of presence/absence of sheets in the paper deck optional unit 107, mounted state of each sheet discharge bin in the finisher optional unit 108, state of presence/absence of stapling needles or the like is transmitted to the video controller 103 from the optional controller unit 106. It should be noted that the optional controller unit 106 can be directly connected to the video controller by a CPU bus.

An OPTRDY (optional ready) signal 92 acts as a signal for indicating an option which is designated by the video controller 103, e.g., indicating whether the staple is in a usable state or not and is transmitted to the video controller 103 from the optional controller unit 106. A POUTT (paper-out timing) signal 93 acts as a timing signal for indicating such a timing as the printer 102 itself discharges the recording sheets. A PFEDT (paper feed timing) signal 94 acts as a signal for indicating such a timing as the printer 102 itself accepts the recording sheets from the optional unit. An SPCNG (speed change) signal 95 acts as a signal for reducing the speed of the recording sheet S which is carried at a high speed in the optional unit to match the carrying speed with that of the printer 102 itself.

A reference numeral 81 denotes a communication interface, wherein such a command as designating of the sheet feed for the sheet feed cassette provided in the printer 102 itself, designating of the sheet discharge for the sheet discharge tray 231 provided in the printer 102 itself, printing or the like is transmitted to the engine controller 105 from the video controller 103. Then, such a status as state of presence/absence of sheets in the sheet feed cassette 230 provided in the printer 102 itself, paper jamming or the like is transmitted to the video controller 103 from the engine controller 105. A VDO signal 82 indicates bit data transmitted from the video controller 103.

The generalized interface 90 is structured by five hard signals of the serial communication interface 91, the OPTRDY signal 92, the POUTT signal 93, the PFEDT signal 94 and the SPCNG signal 95.

The three signals of the POUTT signal 93, the PFEDT signal 94 and the SPCNG signal 95 are outputted from the engine controller 105 and are inputted to the optional controller unit 106 through the video interface 80 passing through the video controller 103.

Figure 4:
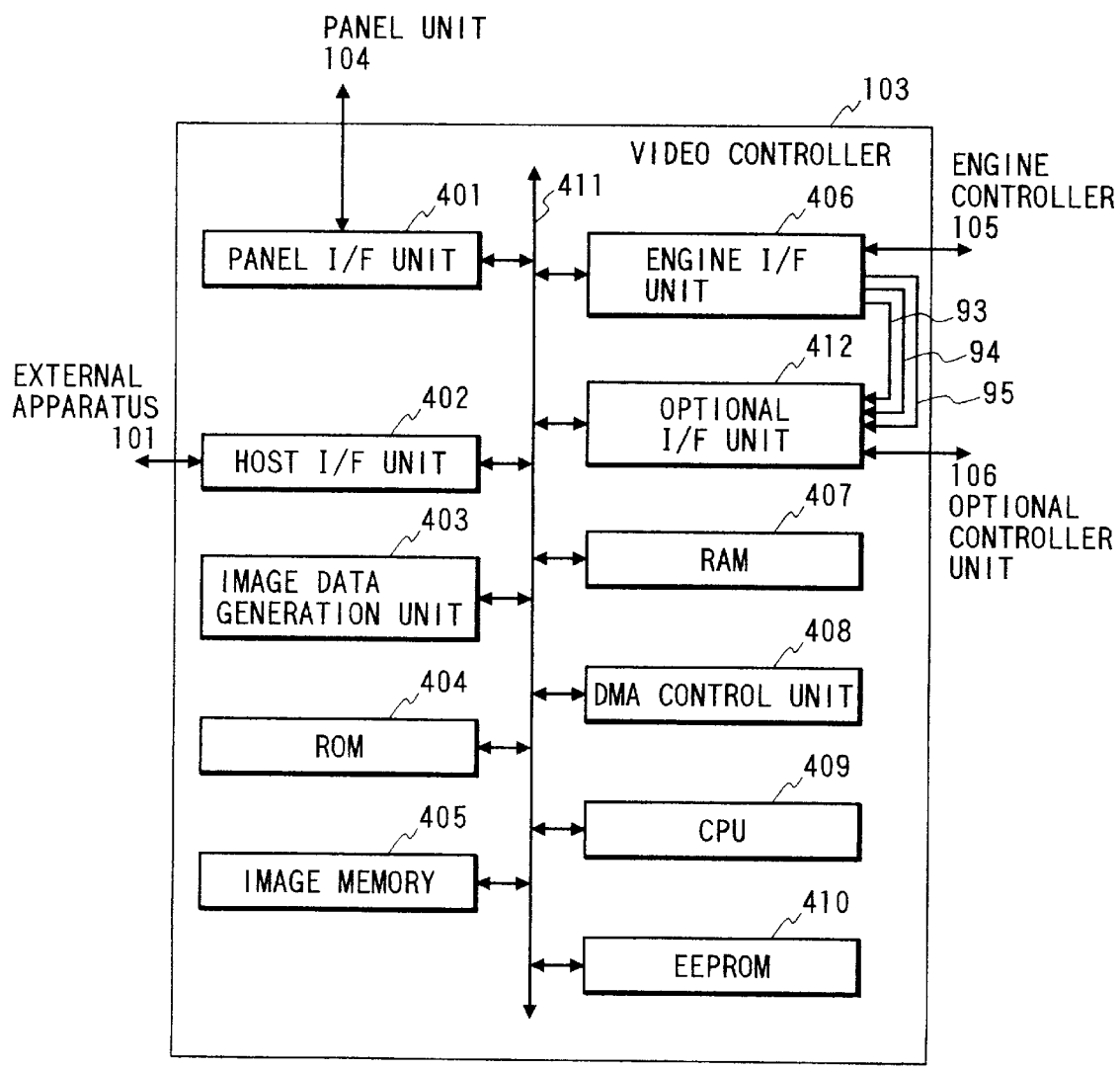
FIG. 4 is a block diagram for explaining the structure of a video controller shown in FIG. 1.

FIG. 4 is a block diagram for explaining the structure of the video controller 103 shown in FIG. 1. In FIG. 4, the elements same as those in FIG. 1 are added with the same reference numerals respectively.

In FIG. 4, a panel interface (I/F) unit 401 receives various settings and instructions from a user via the panel unit 104 by performing a data communication with the panel unit 104. A host interface (I/F) unit 402 acts as an input/output unit for inputting and outputting signals to communicate with the external apparatus 101. An engine interface (I/F) 406 acts as an input unit for inputting a signal from the engine controller 105 and also performs a data signal transmission from an output buffer (not shown) and a communication control with the engine controller 105.

An image data generation unit 403 generates bit map data used in an actual printing based on control data transmitted from the external apparatus 101. An image memory 405 stores image data. A CPU 409 manages an entire control of the video controller 103. A ROM 404 stores a control code of the CPU 409. A RAM 407 acts as a temporary storage means used by the CPU 409. An EEPROM 410 is structured by a non-volatile memory medium.

A DMA (direct memory access) control unit 408 transfers the bit map data in the image memory to the engine interface unit 406 based on an instruction from the CPU 409. An optional interface (I/F) unit 412 communicates with the optional controller unit 106 in accordance with the instruction from the CPU 409. The POUTT signal 93, the PFEDT signal 94 and the SPCNG signal 95 are transmitted to the generalized interface 90 passing through the engine interface unit 406.

A system bus 411 has an address bus and a data bus. The panel interface unit 401, the host interface unit 402, the image data generation unit 403, the ROM 404, the image memory 405, the engine interface unit 406, the RAM 407, the DMA control unit 408, the CPU 409, the EEPROM 410 and the optional interface unit 412 are connected to the system bus 411 respectively and can access to all functions on the system bus 411.

The control code (program) for controlling the CPU 409 is to be structured by an OS which performs a time divisional control with a unit of load module called as a task depending on a system clock (not shown) and a plurality of load modules (tasks), which are described later and shown in FIGS. 5 to 7, operate with a unit of function.

Hereinafter, a control operation of the image recording apparatus corresponding to the present invention will be described every task with reference to FIGS. 5 to 7. It should be noted that processes shown in FIGS. 5 to 7 are executed by the CPU 409 in the video controller 103 shown in FIG. 4 based on the program stored in the ROM 404 or the like. Each task is subjected to a time-divisional process by the video controller 103.

Figure 5:
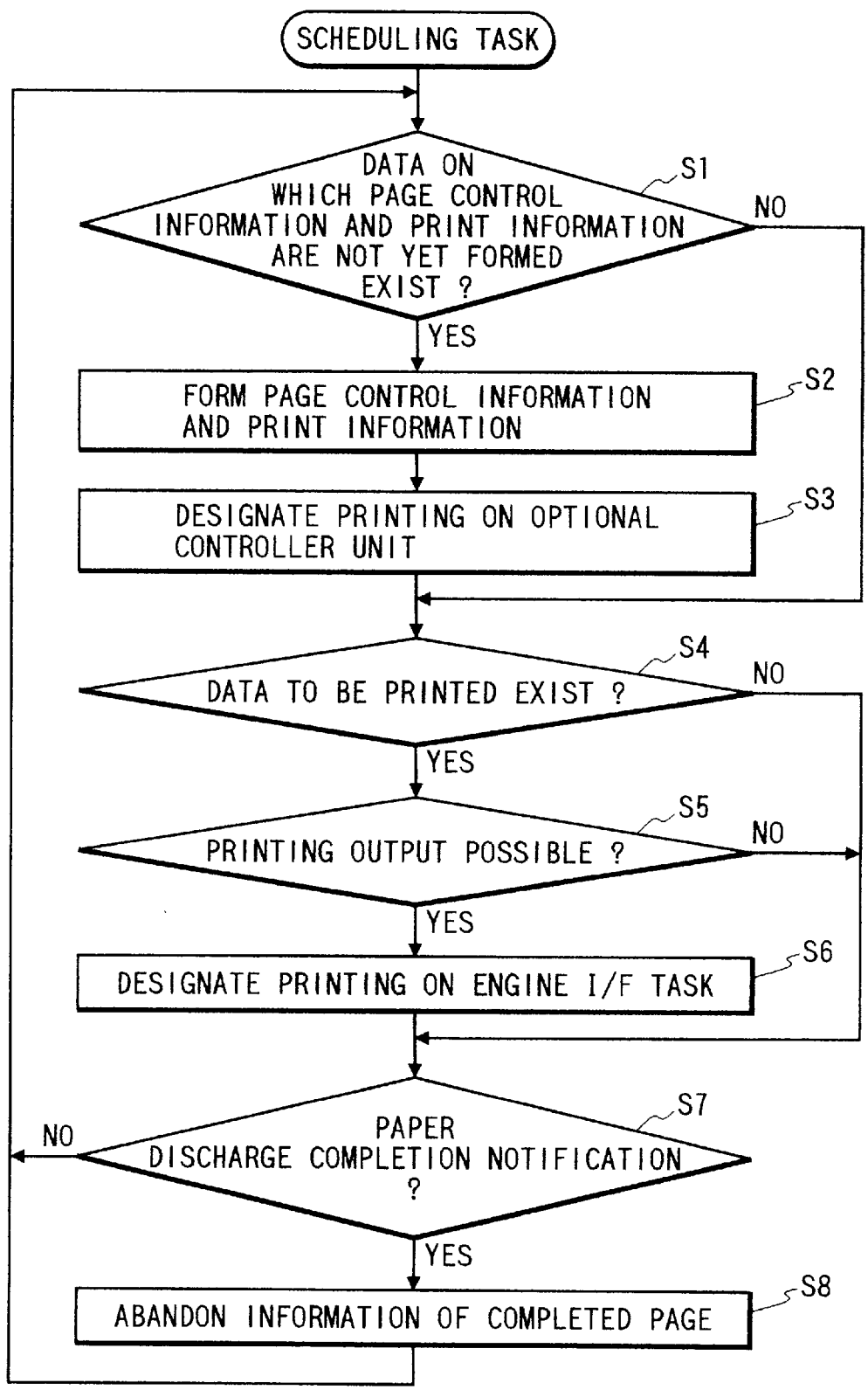
FIG. 5 is a flow chart showing an example of a process of scheduling task, wherein the video controller shown in FIG. 4 performs a scheduling based on control data and print data transferred from an external apparatus.

FIG. 5 is a flow chart showing an example of a process of scheduling task, wherein the video controller 103 shown in FIG. 4 performs a scheduling based on control data and print data transferred from the external apparatus 101.

Initially, it is judged whether data on which page control information and print information are not yet formed within the print data, which is received from the external apparatus 101 such as the host computer or the like, exists or not (step S1). In a case where the data on which the page control information and the print information are not yet formed does not exist (received print data, wherein all of the page control information and the print information are formed), a flow advances to a process in a step S4.

On the other hand, if it is judged that the data on which the page control information and the print information are not yet formed still exists in the step S1, the page control information (including designation of sheet feed unit, designation of sheet discharge unit, designation of the size of sheets used for outputting, designation of staple or the like) and the print information are formed based on the print data received from the host computer (step S2). Subsequently, the page control information and the print information formed in the step S2 are directly designated to the common memory in the optional controller unit 106 shown in FIG. 10 described later (step S3). In this scheduling task, the page control information for plural pages is designated (reserved) precedent to a printing operation in spite of the progressed state of an actual printing.

Subsequently, it is judged whether pages which are not yet printed in spite of forming the page control information and the print information (data to be printed) exist or not (step S4). In a case where pages which are not yet printed (data to be printed) exist, it is judged whether a desired print-out can be performed or not with reference to the basic status area shown in FIG. 10 (step S5). If it is judged that the print-out can be performed, designate a printing on an engine interface task (engine I/F task) shown in FIG. 6 described later. Consequently, the engine I/F task which receives a notification of printing designation performs the printing while maintaining a synchronization.

On the other hand, if it is judged that pages which are not yet printed (data to be printed) does not exist in the step S4 or judged that the print-out can not be performed in the step S5, not designate the printing on the engine I/F task and a flow advances to a process in a step S7.

Subsequently, it is observed whether a sheet discharge completion notification concerning a page already started to print is transferred or not (step S7). If the sheet discharge completion notification is received, information of completed page is abandoned to execute a page state renewal process in order to prepare a vacant area in a memory (step S8), then a flow returns to the judgement process in the step S1.

On the other hand, if it is judged that the sheet discharge completion notification is not transferred in the step S7, a flow returns to the judgement process in the step S1.

Figure 6:
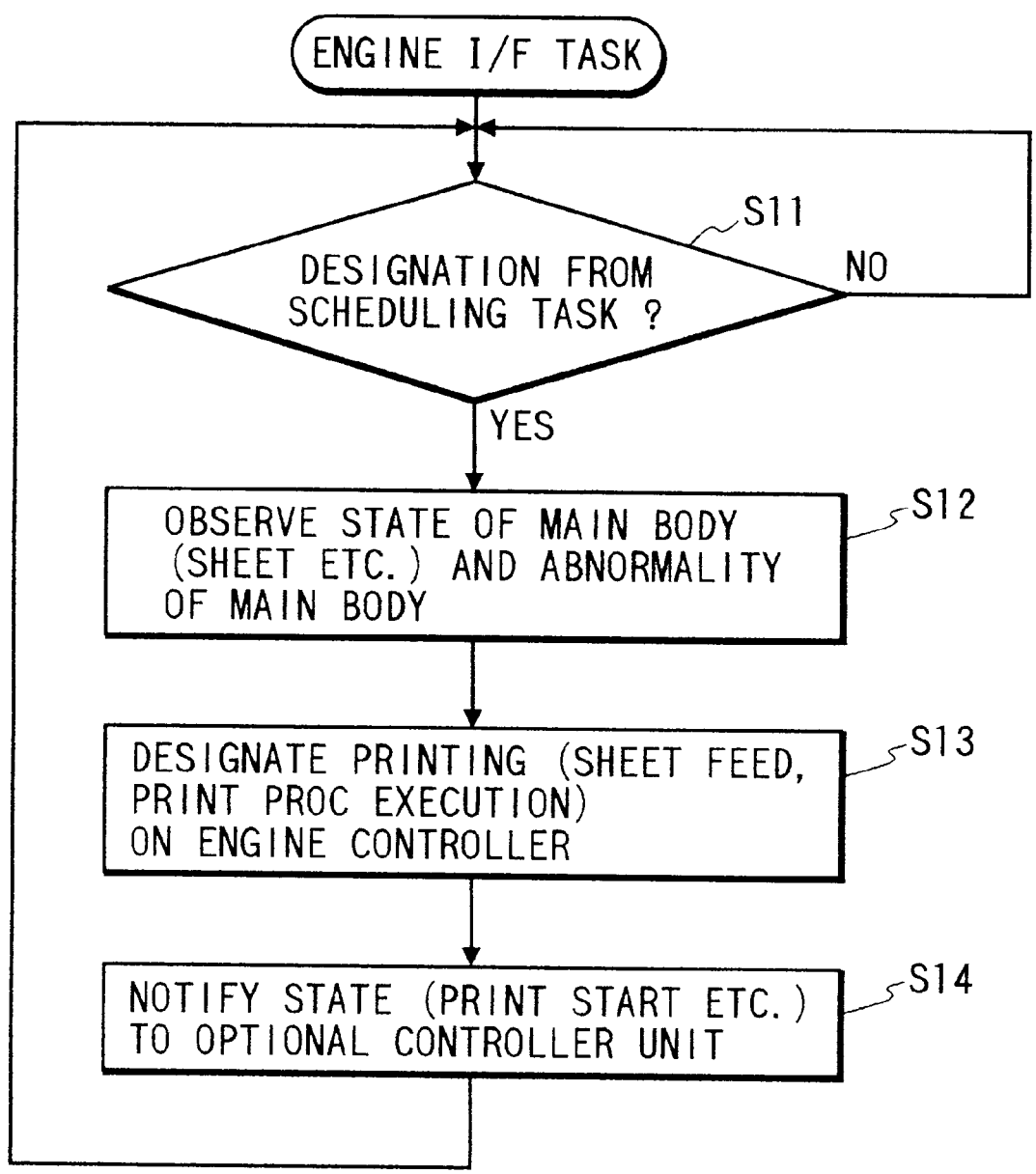
FIG. 6 is a flow chart showing an example of a process of engine interface task (engine I/F task) for performing the printing based on page information formed by the scheduling task shown in FIG. 5.

FIG. 6 is a flow chart showing an example of a process of engine interface task (engine I/F task) for performing the printing based on page information formed by the scheduling task shown in FIG. 5.

Initially, it is judged whether the printing designation from the scheduling task exists or not (step S11). If it is judged that the printing designation does not exist, it is weighted not to execute the process. If it is judged that the printing designation exists, the state of the printer 102 itself (printable, sheet size, sheet existence or the like), the abnormality of the printer 102 itself (no sheet, door opening, sheet jamming or the like) or the like is observed to notify it to a required task (step S12). Subsequently, the printing designation (sheet feed, print process execution) is executed on the engine controller 105 through the engine I/F unit 406 to execute the print process (step S13).

Further, such a state as the sheet feeding start, a printing start or the like is notified to the optional controller unit 106 through the optional I/F unit (step S14) and a flow returns to the process in the step S11.

Figure 7:
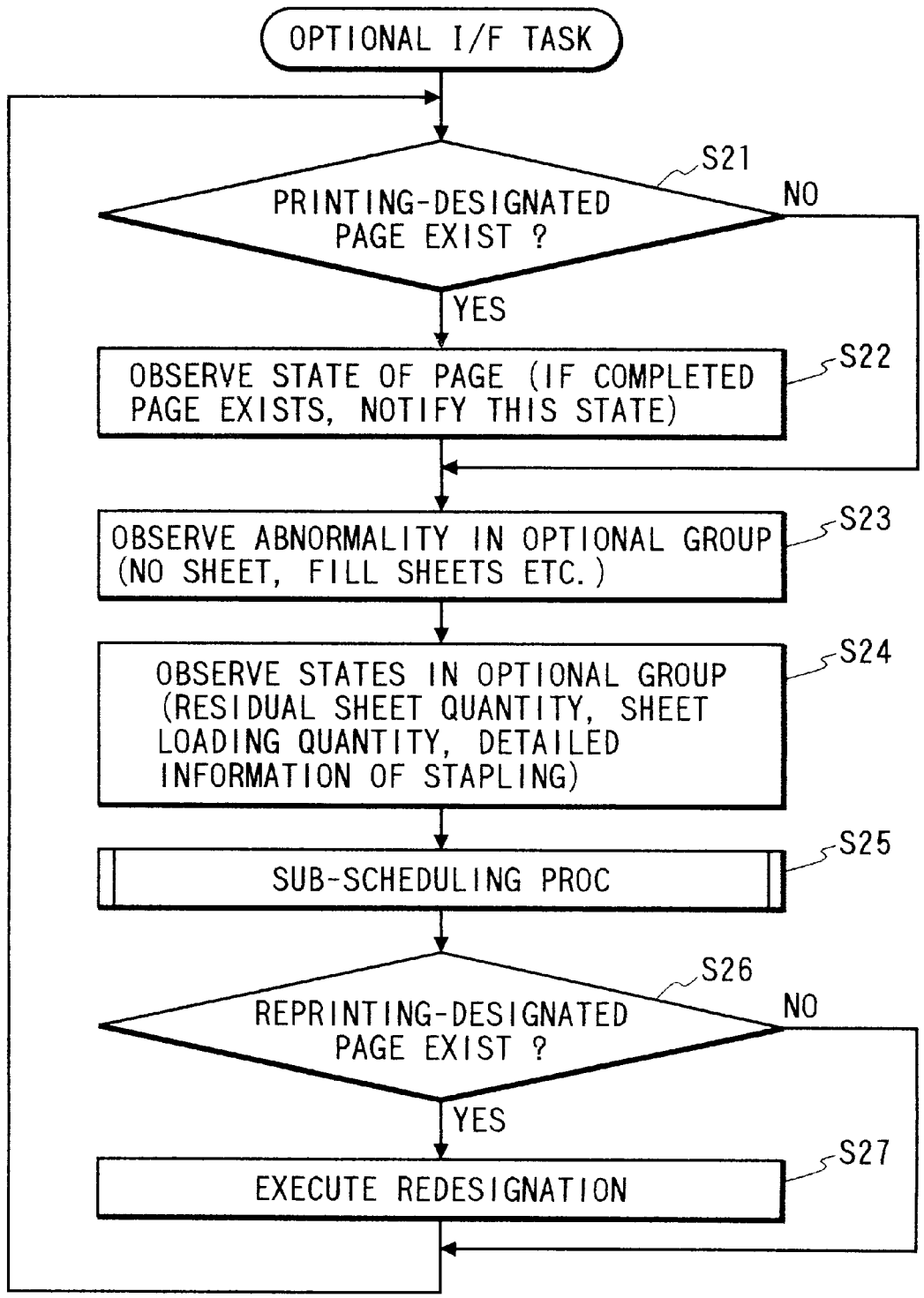
FIG. 7 is a flow chart showing an example of a process of optional interface task (optional I/F task) for observing a page state designated by the scheduling task shown in FIG. 5 and notifying information which is re-designated by the engine interface task and other tasks to an optional controller unit.

FIG. 7 is a flow chart showing an example of a process of optional interface task (optional I/F task) for observing the page state designated by the scheduling task shown in FIG. 5 and notifying re-designated information to the optional controller unit 106. A re-designation will be described in detail with reference to FIG. 9.

Initially, it is judged whether pages designated to print from the scheduling task exist or not (step S21). If it is judged that printing-designated pages does not exist, a flow shifts to a process in a step S23.

On the other hand, in a step S22, if it is judged that pages designated to print from the scheduling task exist, the state of printing-designated pages is observed. In a case where pages already completed to print exist, it is notified that information of completed pages may be abandoned to the scheduling task (step S22).

Subsequently, the abnormality of the optional units such as no sheet, sheet jamming, fill sheets, no stapling needle or the like is observed to instruct that an operator call is displayed and a re-designation is executed (step S23). Then, the state of the optional units such as the quantity of residual sheets in the sheet-feed optional device, the quantity of residual sheets in the sheet-discharge optional device, detailed information of stapling (shown in FIG. 8 described later) or the like is observed and renewed (step S24) to activate a sub-scheduling process (shown in FIG. 9 described later) (step S25).

Subsequently, it is judged whether re-designated data (page) exists or not upon receiving a re-designation notification from the sub-scheduling process or the like (step S26). If it is judged that the re-designated data (page) exists, the re-designation is executed to the optional controller unit 106 through the optional I/F unit 412 based on the re-designated data (step S27) and a flow returns to the process in the step S21.

On the other hand, in a step S26, if it is judged that the re-designated data (page) does not exist, a flow returns to the process in the step S1.

The engine interface task executes a printing process based on the re-designation in the step S27.

The changing state of the detailed information of stapling transferred from the optional controller unit 106 shown in FIG. 1 will be described with reference to FIG. 8.

Figure 8:
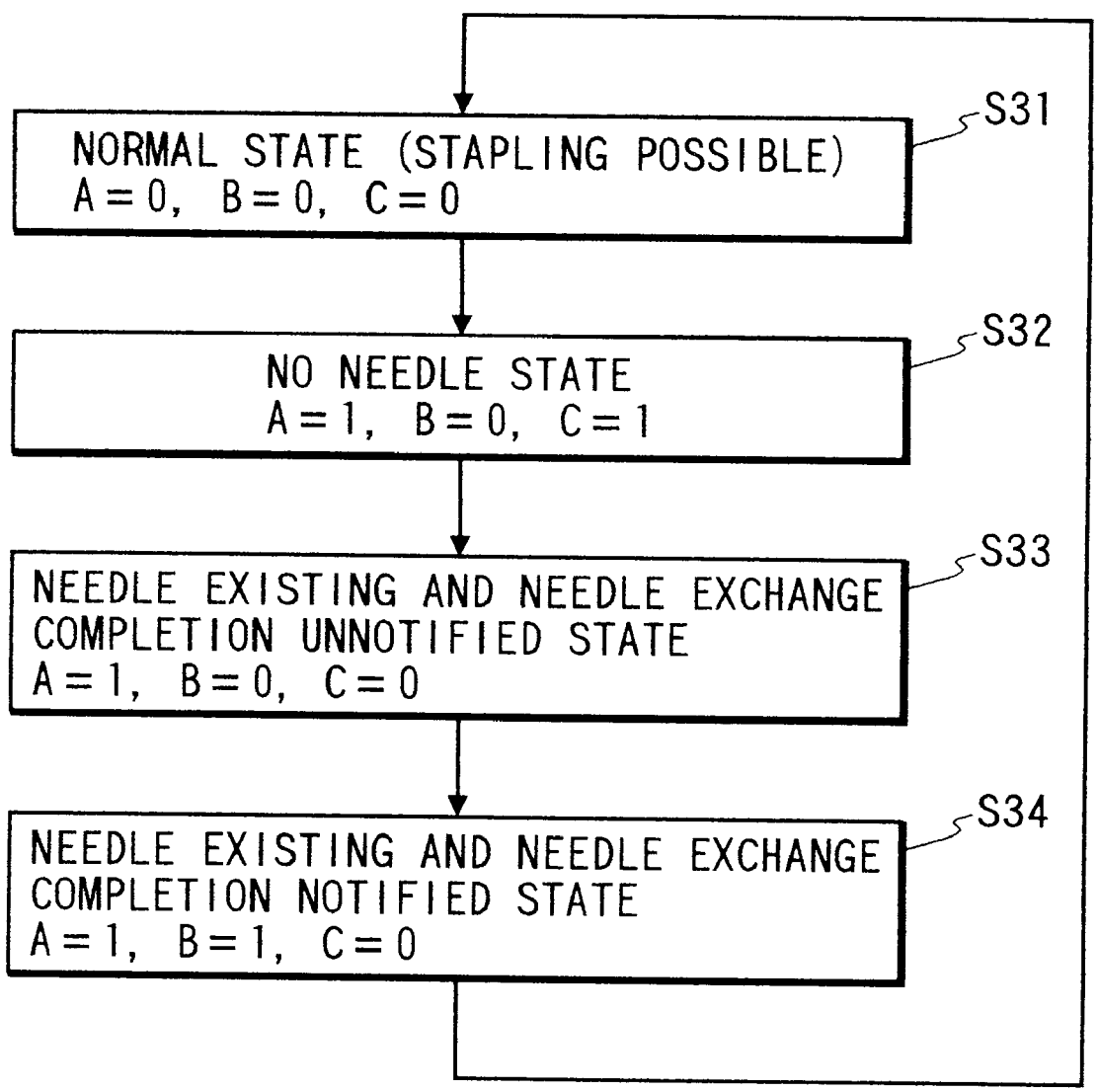
FIG. 8 is a state changing view showing an example of the changing state of detailed information of stapling transferred from the optional controller unit shown in FIG. 1.

FIG. 8 is a view showing an example of a state change of the stapling detailed information transferred from the optional controller 106 in FIG. 1.

In FIG. 8, a reference symbol A denotes a stapling job inhibition bit. When this bit is "0", it indicates "stapling possible". When this bit is "1", it indicates "stapling impossible". A reference symbol B denotes a test stapling demand bit. When this bit is "0", it indicates "no demand of test stapling". When this bit is "1", it indicates "demand of test stapling". A reference symbol C denotes a no-needle sensor information bit. When this bit is "0", it indicates "stapling needle existing". When this bit is "1", it indicates "no stapling needle". The stapling job inhibition bit A, the test stapling demand bit B and the no-needle sensor information bit C are observed by the command and status.

A status (step S31) indicates such a state as the stapling needle exists and pulling up the stapling needle is completed, that is, it is possible to execute the stapling. Therefore, the stapling job inhibition bit A is "0" (stapling possible), the test stapling demand bit B is "0" (no demand of test stapling) and the no-needle sensor information bit C is "0" (stapling needle existing). In this state, a message of "print possible" is ordinarily displayed on the panel unit 104, thereby enabling to execute the stapling job.

Subsequently, a status (step S32) indicates such a state as the stapling needle does not exist due to the execution of the stapling job. Therefore, the stapling job inhibition bit A is "1" (stapling impossible), the test stapling demand bit B is "0" (no demand of test stapling) and the no-needle sensor information bit C is "1" (no stapling needle). At this time, a message of "no needle" is displayed on the panel unit 104 to notify the no-needle state to a user. The user recognizes the no-needle state by the message of "no needle" and exchanges needles.

A status (step S33) indicates such a state as the stapling needles exist (already supplied), however, the test stapling is not yet completed. Therefore, the stapling job inhibition bit A is "1" (stapling impossible), the test stapling demand bit B is "0" (no demand of test stapling) and the no-needle sensor information bit C is "0" (needle existing). In this state, if the stapling is executed (if the stapling is executed immediately after supplying needles), the pulling up of the stapling needle is not performed normally, that is, the possibility of defective stapling will be occurred. Therefore, a message of "depress a stapling needles supplied button" is displayed on the panel unit 104 in order to promote an execution of the test stapling for the user.

When the user completes to supply needles, the user depresses the stapling needles supplied button, which is provided oft the operation unit 108b in the finisher optional unit 108. When the user depresses the stapling needles supplied button (not shown) on the operation unit 108b in the sheet-discharge optional device 108 in accordance with a message of "depress a stapling needles supplied button", a corresponding signal is generated to change the test stapling demand bit B to "1". That is, the state is changed to a status (step S34) to start a test stapling process.

The status (step S34) is the state of executing the test stapling process, wherein the stapling job inhibition bit A is "1" (stapling impossible), the test stapling demand bit B is "1" (demand of test stapling) and the no-needle sensor information bit C is "0" (needle existing). At this time, a message of "in executing of test stapling" is displayed on the panel unit 104. The test stapling is a required process in order to pull up the stapling needle. Since an ordinary stapling job can be executed after the process of test stapling is completed, the process is shifted to the status (step S31) upon completing the test stapling. Thereafter, the state changing from the status (step S31) to the status (step S34) is repeated.

The optional controller unit 106 performs the state observation by the command and status transferred from the finisher optional controller 108a and transfers the detailed information of stapling to the CPU 409 in the video controller 103 to operate the process of test stapling as a trigger of a notification of "no needle", a test stapling execution demand, a test stapling execution or the like by the detailed information of stapling.

Hereinafter, an operation of the sub-scheduling process will be described with reference to FIGS. 9 to 11.

Figure 9:
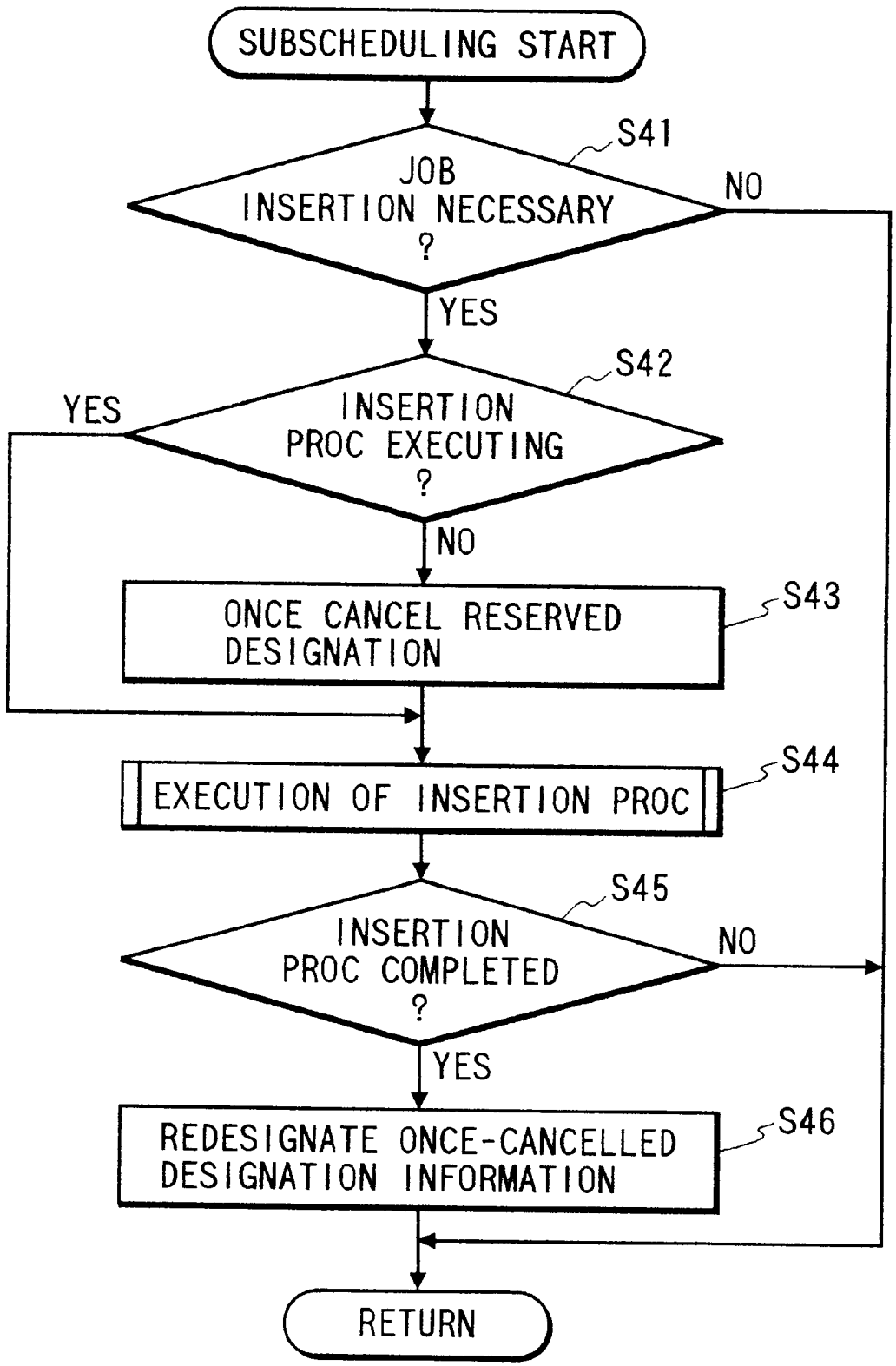
FIG. 9 is a flow chart for explaining a test scheduling process executed to the optional controller unit or the engine controller by the video controller shown in FIG. 4.

FIG. 9 is a flow chart for explaining the sub-scheduling process executed to the optional controller unit 106 or the engine controller 105 by the video controller 103 shown in FIG. 4. In the present embodiment, especially, the test stapling process to pull up the stapling needle after supplying the stapling needles will be described.

Initially, it is judged whether an insertion of the test stapling job is required or not based on the detailed information of stapling shown in FIG. 8 (by referring to the test stapling demand bit) (step S41). If it is judged that the test stapling is required (in case of test stapling demand bit is "1"), it is judged whether an insertion process of the test stapling is started or not (step S42). If the insertion process of the test stapling is not yet executed, designation information (reserved designation) designated in a carrying state management area within the common memory in the optional controller unit 106 is once evacuated in the RAM 407 to enable to perform the re-designation after completing the test stapling (step S43). Thereafter, such an instruction as cleaning the designation in the carrying state management area is executed to the optional controller unit 106. Subsequently, in a step S44, a process concerning the test stapling (insertion process) described later with reference to FIG. 11 is executed. After executing the process of inserting the test stapling, a completion of the test stapling is observed in the optional interface task. Then, if a stapling completion notification is received from the optional interface task (step S45), the once-canceled designation information is re-designated (step S46) through the engine interface task (engine I/F task) shown in FIG. 6 and the optional interface task (optional I/F task) shown in FIG. 7 based on the designation information once evacuated (stored in the RAM 407) in the step S43 and the process returns.

On the other hand, if it is judged that the insertion process is not required, (in case of test stapling demand bit B is "0") in the step S41, the process returns as it is.

Figure 11:
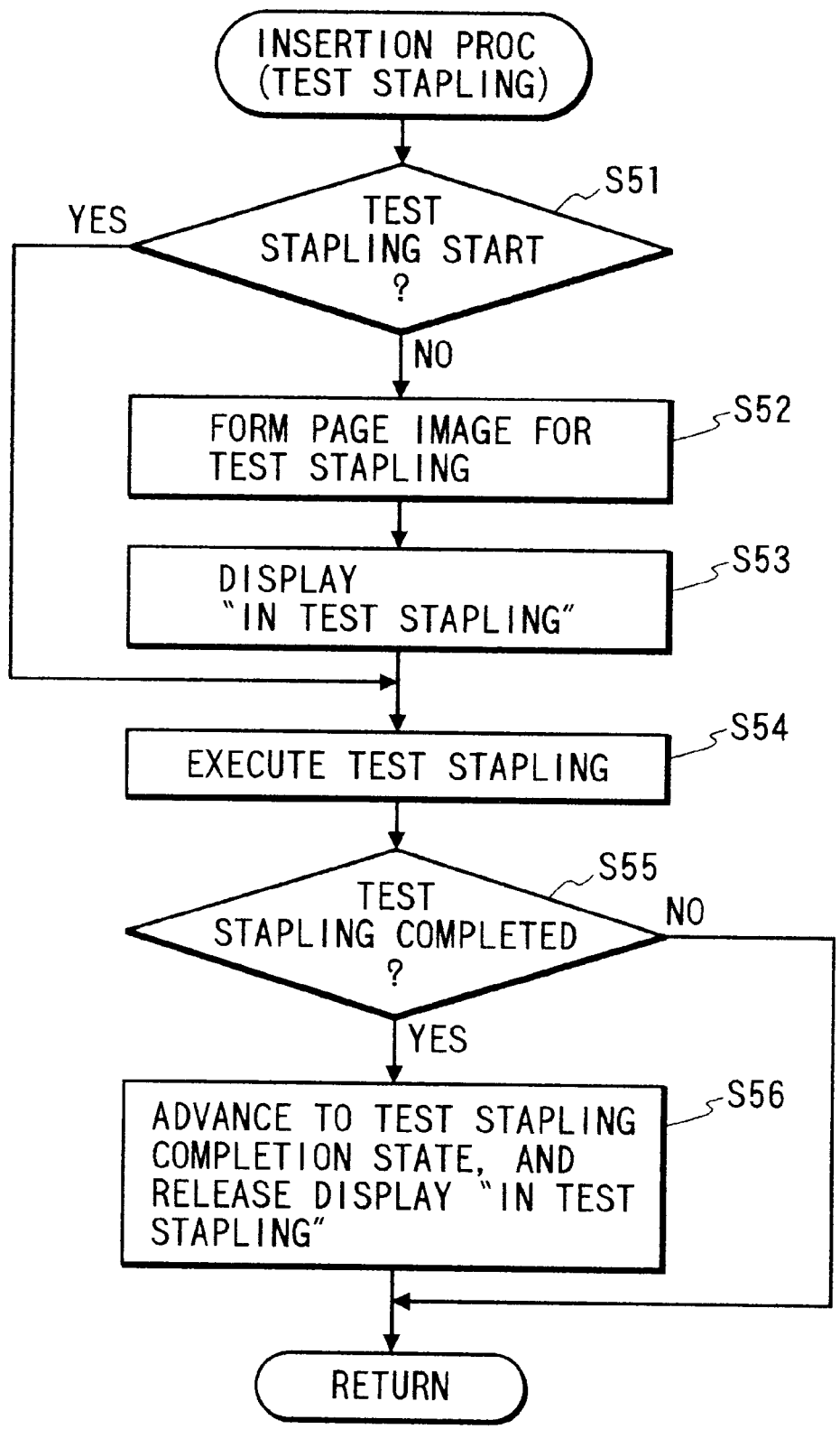
FIG. 11 is a flow chart for explaining a test stapling process in an insertion process shown in FIG. 9.

FIG. 11 is a flow chart for explaining the test stapling process in the insertion process shown in FIG. 9 in the present embodiment.

Initially, it is judged whether the test stapling process is started or not (step S51). If the test stapling process is not yet started, a page image used for the test stapling of one page is formed (step S52). On a sheet used for the test stapling, e.g., such a message as the user can recognize the test stapling is printed. However, an image based on print data inputted from the host computer can not be recorded on the sheet used for the test stapling. Since the sheet used for the test stapling is such a sheet as preventing an idle stapling, it may be a blank sheet.

Subsequently, for example, a message of "in test stapling" is displayed on an LCD in a step S53 in order to notify the fact that the test stapling is started to the user. Further, the page information used for the test stapling formed in the step S52 is transferred to the engine interface task and an execution of the test stapling is notified to the optional controller unit through the optional interface (step S54). Accordingly, the engine interface task feeds one sheet used for the test stapling to the engine controller 105 to be executed a control of recording an image and a control of performing a predetermined times of stapling operation (e.g., eight times) on one discharged sheet used for the test stapling depending on the designation which is executed to the optional controller unit. In the predetermined times of stapling, a position of the stapler 259 is moved every one time of stapling to prevent such an operation of stapling as the same portion on a sheet is stapled.

Subsequently, in a step S55, it is observed whether the test stapling is completed or not to wait for the completion. If the test stapling is completed, a flag of executing the test stapling is initialized to shift to the state of test stapling is completed for releasing the display of "in test stapling", thereby completing the test stapling insertion process.

According to the above processes, the detailed information of stapling is observed to enable to execute the stapling reliably because of preventing the idle stapling, which occurs in a case of mounting the stapling needles with a state of being not able to pull up the stapling needles, by executing the test stapling after exchanging the stapling needles when such a state as a no-needle or a needle jamming is occurred. That is, when a desired job can not be realized, since a process for retrieving the state of not realizing the desired job is executed is executed prior to an execution of the reserved instruction with a unit of sheet, it becomes possible to perform the desired job upon recovering the trouble immediately.

Between the video controller 103 and the engine controller 105, the optional controller unit 106, which entirely controls various optional units and also transfers a command to the engine controller 105, is provided in order that the video controller 103 transfers an instruction to the optional controller unit 106, thereby enabling to use the various optional units without inviting a cost-up of the engine controller 105.

Further, the optional units are connected by the unity optional interface 70 and are discriminated and controlled by an ID, thereby enabling to improve a general-purpose capacity in connecting the optional units.

Character data, image data and the like are held in each of the optional units as ROM data, which is utilized in a displaying operation and a printing operation, thereby enabling to reduce the load on the video controller 103.

Further, a virtual unit is formed by treating the various optional units as one unit logically, thereby enabling to provide a wider utilizing system to the external apparatus and a user.

A user can recognize information easily by providing a display unit in the optional unit itself, thereby enabling to reduce such a fear as executing an erroneous operation.

FIG. 10 is a schematic view showing an example of a memory, which is commonly used by the video controller 103, secured in the RAM provided in the optional controller unit 106 shown in FIG. 1.

In FIG. 10, the video controller 103 performs a designation to each of the optional units through the above-described common memory.

As described above, according to the foregoing processes, in a case where even if the sheet discharge of a large capacity accompanied with the designation of stapling is performed, it is possible to obtain such an output as resulted in using of an optional function which is desired by a user.

Second Embodiment

In the above-described first embodiment, although the example concerning the test stapling was described, the present invention is not limited to this. That is, a sub-scheduling process for executing an expansion process which concerns to, e.g., a calibration process being a density correction process performed by the engine controller 105 and a cleaning process for cleaning the photosensitive drum 220 or the like may be provided.

In the present embodiment, a sheet, on which a printing used in cleaning is automatically performed, is formed every predetermined unit of pages or predetermined-times of sheet jamming while being performed a printing by an image processing apparatus and further, upon displaying a message, the sheet formed to use in cleaning is fed to perform the cleaning.

Even in the cleaning process, the basic operations in the first embodiment explained in FIGS. 5, 6, 7 and 9 are identical with those in the cleaning process. That is, the process in the present embodiment can be realized by substituting the cleaning process for the insertion process in the step S44 of FIG. 9.

An operation of the cleaning process in the present embodiment will be described with reference to FIGS. 12 and 13.

FIG. 13 is a flow chart for explaining a method for notifying a timing of performing the cleaning process, by checking it, to a sub-scheduling process unit. Here, the case for performing the cleaning process at a timing of performing the printing in the engine interface task will be described. The cleaning process may be executed by counting the number of jamming when the jamming occurs, by using another task for observing the abnormality such as the jamming.

In FIG. 13, at the time of starting the printing, the total number of printed pages or the number of jamming from the last time of performing the cleaning is obtained from the EEPROM 410 (step S81). The obtained value is counted and the counted value is written in the EEPROM 410 (step S82). In a step S83, it is judged whether the counted value exceeds a predetermined threshold or not. If the counted value exceeds the predetermined threshold, it is notified that the cleaning process is executed to the sub-scheduling process unit (step S84). After performing the cleaning process, the number of total printed pages is cleared to zero, which is written in the EEPROM (step S85).

On the other hand, the sub-scheduling process unit judges whether a page used in cleaning is started to print or not in a step S61 shown in FIG. 12 upon receiving a notification of executing the cleaning process. If the cleaning process is not yet executed, a necessary image for the cleaning is formed to form an insertion page (step S62). Page information used in cleaning (solid black image : image of which surface is pure black) formed in the step S62 is transferred to the engine interface task and also notifies an execution of printing a page used in cleaning to the optional controller unit through the optional interface (step S63). In a step S64, it is judged whether the printing of the page used in cleaning is completed or not. If the printing is not yet completed and a message is not displayed, concerning the sheet which is printed and formed to be used in cleaning, such a message as putting it on the manual feeding tray 202 is displayed to promote a user's operation (step S66). In a step S67, if a notification that the user completes the operation is received, the sheet used in cleaning set by the user previously is fed to execute the cleaning (step S69). A judgement process in a step S68 operates in order that the task for executing the cleaning process does not repeat the cleaning process after instructing the cleaning designation. Subsequently, it is observed whether a cleaning execution process is completed or not (step S70). If the cleaning process is completed, a flag of executing the cleaning process or the like is initialized to shift to the state of completing the cleaning process (step S71), and the process returns. In this manner, the stain on the photosensitive drum can be transferred to the sheet used in cleaning (sheet of solid black image).

According to the above processes, the factor of stain on the photosensitive drum 220 or the like is observed by counting the total number of printed pages, the number of jamming or the like to execute the cleaning process at a fixed period, thereby enabling to prevent the deterioration of image caused by the stain on the photosensitive drum or the like and output an excellent image.

Third Embodiment

In the above description, as to the sheet jamming, the occurrence number of sheet jamming is counted and in a case where the occurrence number exceeds a certain threshold, the cleaning process is executed automatically. However, in a case where the frequency of jamming is increased, the cleaning process may be executed. For example, if it is assumed that the total number of printed pages at the time of starting to measure is m, the total number of printed pages when the occurrence number of sheet jamming is J-times of regulation number is n and the threshold of frequency in occurring the sheet jamming is P, in a case where the condition of J/(n-m)P is satisfied, the cleaning process may be executed automatically, thereby enabling to execute the cleaning process in accordance with the state.

Of course, it may be operated that the combination of the occurrence number of sheet jamming and the frequency in occurring the sheet jamming is treated as a trigger of the cleaning process.

Fourth Embodiment

In the above first embodiment, the case for executing the sub-scheduling process shown in FIG. 9 in the optional I/F task shown in FIG. 7 is described. However, it may be structured that the process is executed in the scheduling task shown in FIG. 5 or another task.

Fifth Embodiment

In the above first embodiment, the case for executing the test stapling by depressing the stapling needles supplied button (not shown) on the operation unit 108b in the sheet-discharge optional device 108 shown in FIG. 1 as the trigger in the status (step S33) in the state changing view of the detailed information of stapling shown in FIG. 8 is described. However, it may be structured that the test stapling is executed to promote to depress, e.g., on-line keys (not shown) on the panel unit 104 for a user by the fact that the state shifted to "needle existing" from "no needle" is treated as a trigger in case of using the sheet-discharge optional device which does not have the stapling needle supplied button.

Also, it may be structured that the test stapling is executed by the fact that the completion of exchanging the stapling needles confirmation is treated as the trigger without being performed a key-operation by the user.

Sixth Embodiment

In the above first embodiment, the stapling job inhibition bit A is "1" in case of exchanging the stapling needles and not executing the test stapling in the status (step S33) as in the state changing view of the detailed information of stapling shown in FIG. 8. However, it may be structured that the stapling job inhibition bit A is to be "0" and a user can set by using a user's mode, e.g., from the panel unit 104 by providing a mode for executing the stapling without executing the test stapling. In a case where the frequency of idle stapling is in low, it is set that the test stapling is not executed every exchanging of the stapling needles, thereby enabling to prevent an execution of the unnecessary test stapling and improve an operating efficiency of the user.

It may be structured that the user can select an execution of the test stapling by operating the keys on the panel unit 104 to display a message of inquiring the execution of the test stapling on, e.g., the panel unit 104 or the operation unit 108b in the sheet-discharge optional device 108 after exchanging the stapling needles.

In case of a test stapling mode (test stapling process), a stapling (test stapling) is executed to a job of one-sheet printing. However, in case of a normal mode (normal stapling process), the stapling is inhibited to the job of one-sheet printing.

Accordingly, such an unnecessary stapling process as executing the stapling process to the sheet of one-sheet printing (meaningless) can be prevented.

It is needless to say that an image recording apparatus of the present invention is not limited to a laser beam printer but may be available to an ink jet printer or the like. The case for connecting two optional units is described, however, more various optional units can be connected. Also, the function of optional units may be commonly held by a main apparatus.

As described above, it is needless to say that an object of the present invention also can be attained to supply a recording medium which stores a program code of software for realizing the function in the above-described embodiments to a system or an apparatus to be read out and executed the program code by the system or a computer (CPU or MPU) provided in the apparatus.

In this case, the program code itself read out from the recording medium is to realize a new function of the present invention and the recording medium which stores the program code is to construct the present invention.

As the recording medium for supplying the program code, e.g., a floppy disk, a hard disk, an optical disk, a magneto-optical disk, a CD-ROM, a CD-R, a magnetic tape, a non-volatile memory card, a ROM, an EEPROM or the like can be used.

It is needless to say that not only the function of the above-described embodiments can be realized but an OS (operating system) or the like operating on the computer executes a part or all of the actual process which can realize the function of the above-described embodiments by executing the program code read out by the computer.

Further, it is needless to say that the program code read out from the recording medium is written in a memory which is provided in a function expansion board inserted in the computer or the function expansion unit connected to the computer, thereafter, on the basis of an instruction of the program code, a CPU or the like provided in the function expansion board or the function expansion unit executes a part or all of the actual process which can realize the function of the above-described embodiments.

The present invention may be applied to a system structured by a plurality of apparatuses or to an apparatus structured by one device. It is needless to say that the present invention can be adapted to the case of attaining an object by supplying a program to a system or an apparatus. In this case, a recording medium which stores a program expressed by a software for attaining the present invention is read out on the system or the apparatus, thereby, it becomes possible that the system or the apparatus obtains an effect of the present invention.

Further, the program expressed by the software for attaining the present invention is read out from a data base on a network by down loading by using a communication program, thereby, it becomes possible that the system or the apparatus obtains an effect of the present invention.

The present invention can be modified in various manner, within the scope of the following claims.

What is claimed is:

1. A controller which manages a sheet feed device for feeding sheets and a secondary controller for controlling a sheet feed device for feeding sheets and a sheet carry device having means to staple the sheets by using a stapler, comprising:

input means for inputting a job from a computer;

first instruction means for outputting an instruction concerning a sheet feed process of said sheet feed device and an instruction concerning a sheet stapling process of said sheet carry device in units of sheets to the secondary controller in accordance with the job inputted by said input means, said first instruction means reserving an instruction for the plural sheets in the secondary controller;

detection means for detecting that a desired job can not be realized in accordance with a stapling member of said sheet carry device being exhausted; and second instruction means for outputting, in accordance with detection by said detection means that the desired job can not be realized, an instruction to perform a process to retrieve the state that the desired job can not be realized, in preference to execution of the instruction reserved by said first instruction means, wherein the instruction outputted by said second instruction means includes an instruction to feed the sheets from said sheet feed device in accordance with the stapling member being supplemented in said sheet carry device and an instruction to perform the stapling process a predetermined number of times on the sheets carried by said sheet carry device.

2. A controller according to claim 1, wherein said second instruction means once cancels the instruction reserved by said first instruction means, outputs an instruction of a retrieval process, and causes said first instruction means to output the once-cancelled instruction after the retrieval process is completed.

3. A controller which manages a secondary controller for controlling an image formation apparatus to form an image on the sheet, comprising:

input means for inputting a job from a computer;

first instruction means for outputting an instruction concerning an image formation process in an image formation apparatus in units of sheets to the secondary controller in accordance with the job inputted by said input means, said first instruction means reserving an instruction for the plural sheets in the secondary controller; and second instruction means for outputting an instruction to perform a cleaning process on the image formation apparatus, in preference to execution of the instruction reserved by said first instruction means, in accordance with the image formation apparatus performing image forming a predetermined number of times or sheet jamming occurring a predetermined number of times in the image formation apparatus.

4. A control method in a controller which manages a sheet feed device for feeding sheets and a secondary controller for controlling a sheet feed device for feeding sheets and a sheet carry device having means to staple the sheets by using a stapler, said method comprising:

an input step of inputting a job from a computer;

a first instruction step of reserving an instruction concerning a sheet feed process of the sheet feed device and an instruction concerning a sheet stapling process of the sheet carry device in units of sheets to the secondary controller, according to the input job input in said input step, wherein in said first instruction step the instructions corresponding to the plural sheets are reserved for the secondary controller;

a detection step of detecting that a desired job can not be realized in accordance with a stapling member of the sheet carry device being exhausted; and a second instruction step of outputting, in accordance with it being detected that the desired job can not be realized, an instruction to perform a process to retrieve the state that the desired job can not be realized, in preference to execution of the already reserved instruction, wherein the instruction outputted in said second instruction step includes an instruction to feed the sheets from the sheet feed device in accordance with the stapling member being supplemented in the sheet carry device and an instruction to perform the stapling process a predetermined number of times on the sheets carried by the sheet carry device.

5. A method according to claim 4, wherein said second instruction step once cancels the instruction reserved in said first instruction step, outputs an instruction of a retrieval process, and causes said first instruction step to output the once-cancelled instruction after the retrieval process is completed.

6. A control method for a controller which manages a secondary controller for controlling an image formation apparatus to form an image on a sheet, said method comprising:

an input step of inputting a job from a computer;

a first instruction step of outputting an instruction concerning an image formation process in an image formation apparatus in units of sheets to the secondary controller in accordance with the job inputted in said input step, said first instruction step reserving an instruction for the plural sheets in the secondary controller; and a second instruction step of outputting an instruction to perform a cleaning process on the image formation apparatus, in preference to execution of the instruction reserved in the first instruction step, in accordance with the image formation apparatus performing image forming a predetermined number of times or sheet jamming occurring a predetermined number of times in the image formation apparatus.

7. A controller for controlling an image formation system, said image formation system being composed of an image formation apparatus for forming an image on a sheet and a sheet process apparatus having means to staple the sheets discharged from said image formation apparatus with a stapling member, and said controller comprising:

control means for controlling, in a state in which there is no stapling member in the sheet process apparatus, said sheet process apparatus to perform the stapling process a predetermined number of times for the sheet discharged from said image formation apparatus, in accordance with the stapling member being supplemented.

8. A controller according to claim 7, wherein said image formation apparatus forms on the sheet the image based on a job input from an external apparatus, and said control means causes said sheet process apparatus to perform the stapling process the predetermined number of times for the sheet on which the image based on the job input from the external apparatus is not formed.

9. A controller according to claim 8, wherein said image formation apparatus forms a predetermined image different from the image based on the job input from said external apparatus, on the sheet to which the stapling process of the predetermined number of times is performed.

10. A controller according to claim 7, wherein the sheet to which the stapling process of the predetermined number of times is performed is a blank sheet.

11. A controller for controlling an image formation apparatus which forms on a sheet an image based on a job input from an external apparatus, comprising:

control means for controlling said image formation apparatus to perform a cleaning process of said image formation apparatus in preference to the image formation process based on the job input from said external apparatus in accordance with sheet jamming occurring a predetermined number of times in said image formation apparatus.

12. A controller according to claim 11, wherein said image formation apparatus forms on the sheet a predetermined image for the cleaning process, the predetermined image being different from the image based on the job input from said external apparatus.

13. A control method for controlling an image formation system, said image formation system being composed of an image formation apparatus for forming an image on a sheet and a sheet process apparatus having means to staple the sheets discharged from the image formation apparatus with a stapling member, and said method comprising:

a control step of controlling, in a state in which there is no stapling member in the sheet process apparatus, the sheet process apparatus to perform the stapling process a predetermined number of times for the sheet discharged from the image formation apparatus, in accordance with the stapling member being supplemented.

14. A method according to claim 13, wherein the image formation apparatus forms on the sheet the image based on a job input from an external apparatus, and in the control step, the stapling process of the predetermined number of times is performed for the sheet on which the image based on the job input from the external apparatus is not formed.

15. A method according to claim 14, wherein the image formation apparatus forms a predetermined image different from the image based on the job input from the external apparatus, on the sheet to which the stapling process of the predetermined number of times is performed.

16. A method according to claim 13, wherein the sheet to which the stapling process of the predetermined number of times is performed is a blank sheet.

17. A control method for controlling an image formation apparatus which forms an a sheet an image based on a job input from an external apparatus, comprising:

a control step of controlling the image formation apparatus to perform a cleaning process of the image formation apparatus in preference to the image formation process based on the job input from the external apparatus, in accordance with sheet jamming occurring a predetermined times in the image forming apparatus.

18. A method according to claim 17, wherein the image formation apparatus forms on the sheet a predetermined image for the cleaning process, the predetermined image being different from the image based on the job input from the external apparatus.

19. A computer-readable storage medium for storing a program to cause a controller which manages a secondary controller for controlling a sheet feed device for feeding sheets and a sheet carry device having means to staple the sheets by using a stapler to execute:

an input step of inputting a job from a computer;

a first instruction step of reserving an instruction concerning a sheet feed process of the sheet feed device and an instruction concerning a sheet stapling process of the sheet carry device in units of sheets to the secondary controller, according to the input job input in said input step, wherein in said first instruction step the instructions corresponding to the plural sheets are reserved for the secondary controller;

a detection step of detecting that a desired job can not be realized in accordance with a stapling member of the sheet carry device being exhausted; an a second instruction step of outputting, in accordance with it being detected that the desired job cannot be realized, an instruction to perform a process to retrieve the state that the desired job con not be realized, in preference to execution of the already-reserved instruction, wherein the instruction outputted in said second instruction step includes an instruction to feed the sheets from the sheet feed device in accordance with the stapling member being supplemented in the sheet carry device and an instruction to perform the stapling process a predetermined number of times on sheets carried by the sheet carry device.

20. A computer-readable storage medium for storing a program to cause a controller which manages a secondary controller for controlling an image forming apparatus to form an image on a sheet, to execute:

an input step of inputting a job from a computer;

a first instruction step of outputting an instruction concerning an image formation process in an image formation apparatus in units of sheets to the secondary controller in accordance with the job inputted in said input step, said first instruction step reserving an instruction for the plural sheets in the secondary controller; and a second instruction step of outputting an instruction to perform a cleaning process on the image formation apparatus, in preference to execution of the instruction reserved in said first instruction step, in accordance with the image formation apparatus performing image forming a predetermined number of times or sheet jamming occurring a predetermined number of times in the image forming apparatus.

21. A computer-readable storage medium for storing a program to cause a controller which controls an image forming system composed of an image formation apparatus for forming an image on a sheet and a sheet process apparatus having means to staple the sheets discharged from the image formation apparatus with a stapling member, to execute:

a control step of controlling, in a state in which there is no stapling member in the sheet process apparatus, the sheet process apparatus to perform the stapling process a predetermined number of times for the sheet discharged from the image formation apparatus, in accordance with the stapling member being supplemented.

22. A computer-readable storage medium for storing a program to cause a controller which controls an image formation apparatus for forming on a sheet an image based on a job input from an external apparatus, to execute:

a control step of controlling the image formation apparatus to perform a cleaning process of the image formation apparatus in preference to the image formation process based on the job input from the external apparatus, in accordance with sheet jamming occurring a predetermined number of times in the image formation apparatus.

* * * * *

UNITED STATES PATENT AND TRADEMARK OFFICE
CERTIFICATE OF CORRECTION

PATENT NO. : 6,122,464
DATED : September 19, 2000
INVENTOR(S) : Nobuyoshi Kakigi It is certified that error appears in the above-identified patent and that said Letters Patent is hereby corrected as shown below:

Column 5,
Line 33, "is" should be deleted.

Column 9,
Line 16, "described" should read -- described for --; and
Line 64, "does" should read -- do --.

Column 10,
Line 19, "weighted" should read -- delayed --; and
Line 40, "does" should read -- do --.

Column 11,
Line 52, "be occurred." should read -- occur. --; and
Line 58, "oft" should read -- on --.

Column 13,
Line 36, "is executed" ($2^{nd}$ occurrence) should be deleted; and
Line 46, "cost-up" should read -- cost increase --.

Column 16,
Line 19, "in" should be deleted.

Column 17,
Line 28, "a sheet feed device for" should be deleted; and
Line 29, "feeding sheets and" should be deleted.

UNITED STATES PATENT AND TRADEMARK OFFICE
CERTIFICATE OF CORRECTION

PATENT NO. : 6,122,464
DATED : September 19, 2000
INVENTOR(S) : Nobuyoshi Kakigi It is certified that error appears in the above-identified patent and that said Letters Patent is hereby corrected as shown below:

Column 18,
Line 17, "a sheet" should be deleted; and
Line 18, "feed device for feeding sheets and" should be deleted.

Column 20,
Line 10, "an" (1st occurrence) should read -- on --;
Line 17, "predetermined" should read -- predetermined number of --; and
Line 39, "an" should read -- and --.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*